(12) United States Patent
Sasakawa et al.

(10) Patent No.: US 11,139,476 B2
(45) Date of Patent: Oct. 5, 2021

(54) ACTIVE MATERIAL, ELECTRODE, SECONDARY BATTERY, BATTERY PACK, AND VEHICLE

(71) Applicant: KABUSHIKI KAISHA TOSHIBA, Minato-ku (JP)

(72) Inventors: Tetsuya Sasakawa, Yokohama (JP); Yasuhiro Harada, Isehara (JP); Norio Takami, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 242 days.

(21) Appl. No.: 16/559,260

(22) Filed: Sep. 3, 2019

(65) Prior Publication Data

US 2020/0295363 A1  Sep. 17, 2020

(30) Foreign Application Priority Data

Mar. 12, 2019 (JP) .............................. JP2019-044709
Aug. 28, 2019 (JP) .............................. JP2019-155874

(51) Int. Cl.
*H01M 4/505* (2010.01)
*H01M 4/131* (2010.01)
(Continued)

(52) U.S. Cl.
CPC .............. *H01M 4/505* (2013.01); *B60L 7/10* (2013.01); *B60L 50/64* (2019.02); *H01M 4/131* (2013.01); *H01M 4/134* (2013.01); *H01M 4/364* (2013.01); *H01M 4/366* (2013.01); *H01M 4/46* (2013.01); *H01M 4/525* (2013.01); *H01M 4/623* (2013.01); *H01M 10/0525* (2013.01); *H01M 10/4257* (2013.01); *H01M 50/20* (2021.01); *H01M 50/509* (2021.01); *B60Y 2200/91* (2013.01); *B60Y 2400/112* (2013.01);
(Continued)

(58) Field of Classification Search
None
See application file for complete search history.

(56) References Cited

U.S. PATENT DOCUMENTS

| 5,147,738 A * | 9/1992 | Toyoguchi | H01M 10/052 429/231.3 |
| 2002/0055042 A1 | 5/2002 | Kweon et al. | |
| 2015/0270543 A1* | 9/2015 | Harada | C01G 45/006 429/92 |

FOREIGN PATENT DOCUMENTS

JP     9-199179 A     7/1997
JP     2001-291518 A  10/2001
(Continued)

OTHER PUBLICATIONS

Nakai, I, et al. "Funmatsu X sen Kaiseki no Jissai" Reality of Powder X-Ray Analysis, X-Ray Analysis Investigation Conversazione, The Japan Society for Analytical Chemistry, (Asakura Publishing Co., Ltd), pp. 97-115, 2002 ( With Machine Translation).

*Primary Examiner* — Gregg Cantelmo
(74) *Attorney, Agent, or Firm* — Oblon, McClelland, Maier & Neustadt, L.L.P.

(57) ABSTRACT

According to one embodiment, there is provided an active material represented by a general formula $Li_x(Ni_aCo_bMn_cM_d)_{1-s}(Nb_{1-t}Ta_t)_sO_2$. Here, M is at least one selected from the group consisting of Li, Ca, Mg, Al, Ti, V, Cr, Zr, Mo, Hf, and W, and $1.0 \leq x \leq 1.3$, $0 \leq a \leq 0.9$, $0 \leq b \leq 1.0$, $0 \leq c \leq 0.8$, $0 \leq d \leq 0.5$, $a+b+c+d=1$, $0.005 \leq s \leq 0.3$, and $0.0005 \leq t \leq 0.1$ are satisfied.

14 Claims, 7 Drawing Sheets

(51) Int. Cl.
*H01M 10/0525* (2010.01)
*H01M 10/42* (2006.01)
*B60L 50/64* (2019.01)
*B60L 7/10* (2006.01)
*H01M 4/525* (2010.01)
*H01M 4/46* (2006.01)
*H01M 50/20* (2021.01)
*H01M 4/134* (2010.01)
*H01M 4/36* (2006.01)
*H01M 4/62* (2006.01)
*H01M 4/02* (2006.01)
*H01M 50/509* (2021.01)

(52) U.S. Cl.
CPC .............. *H01M 2004/027* (2013.01); *H01M 2004/028* (2013.01); *H01M 2010/4271* (2013.01); *H01M 2220/20* (2013.01)

(56) References Cited

FOREIGN PATENT DOCUMENTS

| | | |
|---|---|---|
| JP | 2003-068298 | 3/2003 |
| JP | 3866740 B2 | 1/2007 |
| JP | 2015-99767 A | 5/2015 |
| JP | 2017-168263 A | 9/2017 |
| JP | 2018-160446 A | 10/2018 |
| WO | WO 2005/081338 A1 | 9/2005 |
| WO | WO 2018/022989 A1 | 2/2018 |

\* cited by examiner

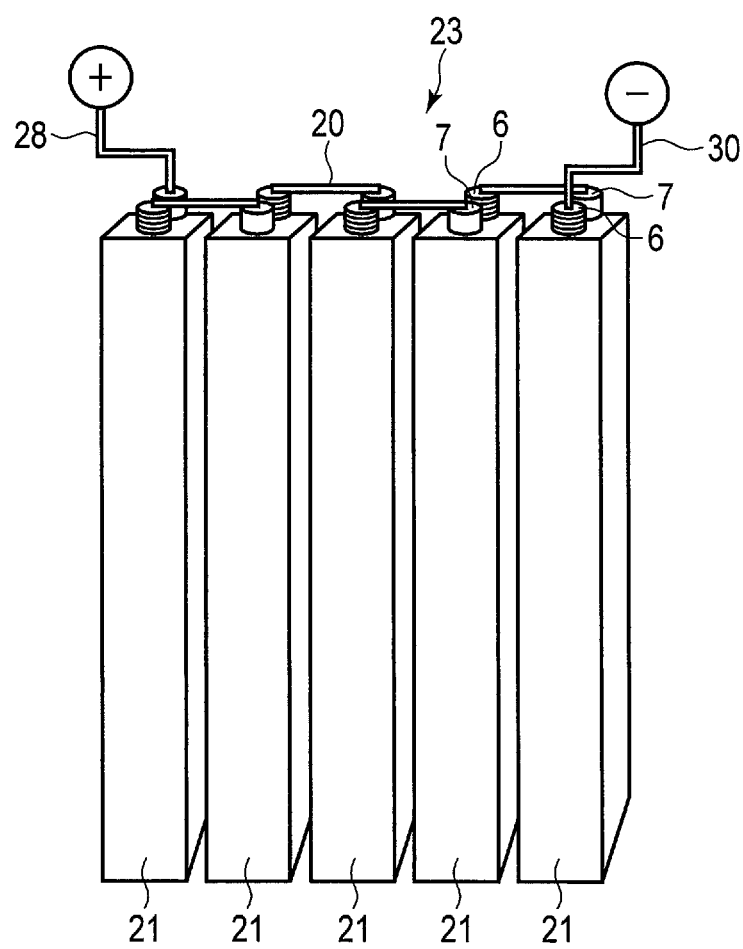
F I G. 7

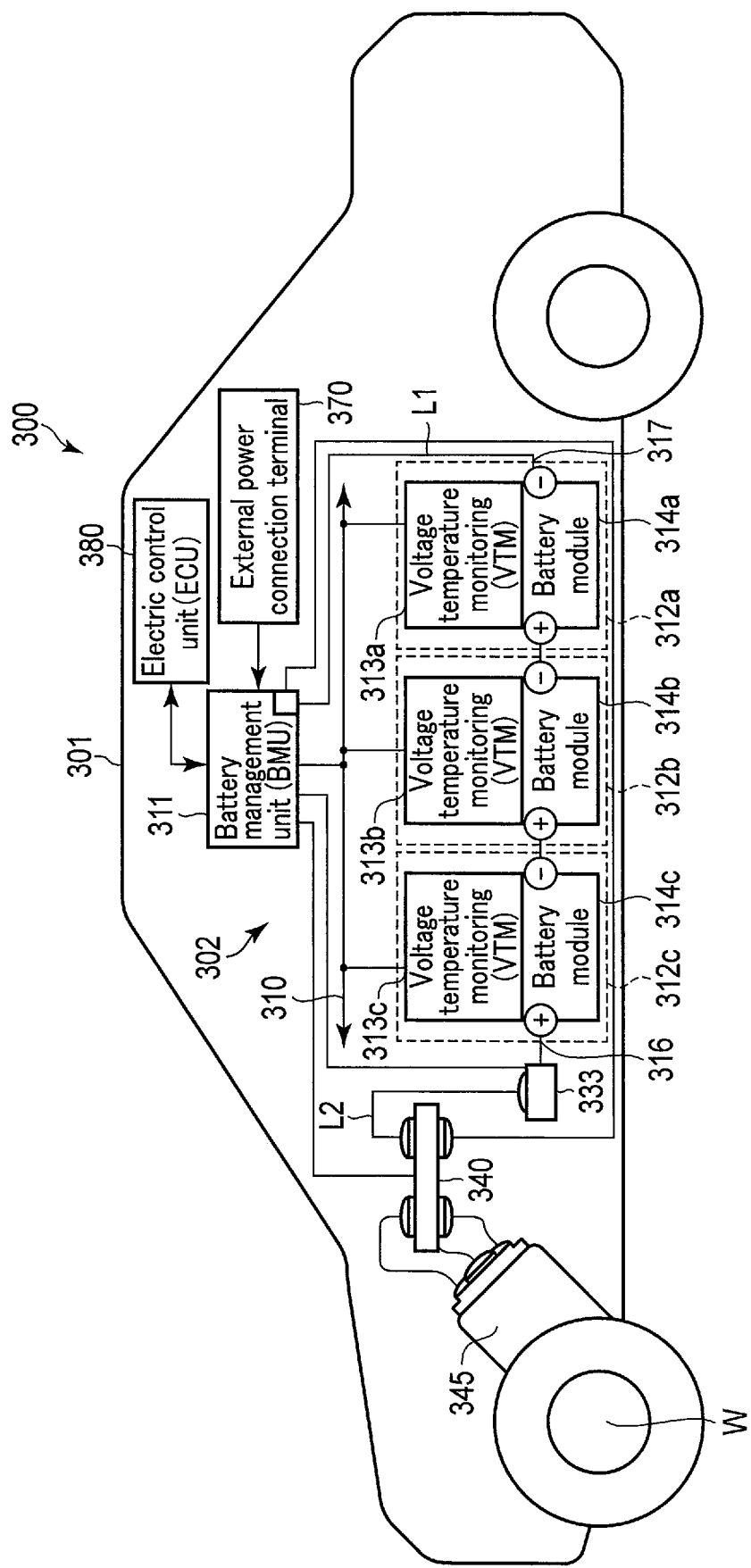
F I G. 11

ACTIVE MATERIAL, ELECTRODE, SECONDARY BATTERY, BATTERY PACK, AND VEHICLE

CROSS-REFERENCE TO RELATED APPLICATIONS

This application is based upon and claims the benefit of priority from Japanese Patent Application No. 2019-044709, filed Mar. 12, 2019, and Japanese Patent Application No. 2019-155874, filed Aug. 28, 2019, the entire contents of all of which are incorporated herein by reference.

FIELD

The present disclosure relates to an active material, an electrode, a secondary battery, a battery pack, and a vehicle.

BACKGROUND

The facilitation of the application of lithium ion batteries to on-board and stationary use has resulted in an increasing demand for higher capacity, longer lifetimes, and higher output. In recent years, as high-capacity positive electrode active materials, attention has focused on lithium-nickel-cobalt-manganese composite oxides represented by a formula Li (Ni, Co, Mn) $O_2$ and having a crystal structure that belongs to a space group R3/m. With these positive electrode active materials, improved capacity becomes possible by increasing an Ni element content ratio in among transition metals. However, one problem with these positive electrode active materials is that they have a short life span stemming from a reduction of capacity due to charge and discharge. Repeated charge and discharge causes oxygen atoms to become extracted from near the surface of a positive electrode active material due to reacting with an electrolyte, causing the formation of an electrochemically inactive rock salt structure layer. This is considered as a major factor behind the reduction in capacity.

Therefore, to improve the life performance, for example, a lithium positive electrode active material including a layer of an oxide or a composite oxide of a metal selected from the group consisting of Mg, Al, Co, K, Na, Ca, Si, Ti and V, on a surface of a lithium metal composite oxide having a layered crystal structure is disclosed.

However, there is a problem of the rate performance of the battery being reduced when a thick composite metal oxide layer is formed to suppress a side reaction between the positive electrode active material and electrolyte. On the other hand, if the composite metal oxide layer is made thin in order to avoid reduced rate performance, the coatability onto the surface of the positive electrode active material is liable to reduce. As a result, there is concern that the suppression of the side reaction will be insufficient.

BRIEF DESCRIPTION OF THE DRAWINGS

FIG. 7 is a perspective view schematically showing an example of a battery module according to a fourth embodiment;

FIG. 11 is a diagram schematically showing another example of the vehicle according to the fifth embodiment.

DETAILED DESCRIPTION

According to one embodiment, there is provided an active material represented by a general formula $Li_x(Ni_aCo_bMn_cM_d)_{1-s}(Nb_{1-t}Ta_t)_sO_2$. Here, M is at least one selected from the group consisting of Li, Ca, Mg, Al, Ti, V, Cr, Zr, Mo, Hf, and W, and $1.0 \leq x \leq 1.3$, $0 \leq a \leq 0.9$, $0 \leq b \leq 1.0$, $0 \leq c \leq 0.8$, $0 \leq d \leq 0.5$, $a+b+c+d=1$, $0.005 \leq s \leq 0.3$, and $0.0005 \leq t \leq 0.1$ are satisfied.

According to another embodiment, provided is an electrode including the active material according to the above embodiment.

According to another embodiment, provided is a secondary battery including a positive electrode, a negative electrode, and an electrolyte. The positive electrode is the electrode according to the above embodiment.

According to still another embodiment, provided is a battery pack including the secondary battery according to the above embodiment.

According to yet another embodiment, provided is a vehicle including the battery pack according to the above embodiment.

Hereinafter, the embodiments are explained.

First Embodiment

An active material according to a first embodiment is represented by a general formula $Li_x(Ni_aCo_bMn_cM_d)_{1-s}(Nb_{1-t}Ta_t)_sO_2$. Here, M is one or more selected from the group consisting of Li, Ca, Mg, Al, Ti, V, Cr, Zr, Mo, Hf, and W; satisfied here are $1.0 \leq x \leq 1.3$, $0 \leq a \leq 0.9$, $0 \leq b \leq 1.0$, $0 \leq c \leq 0.8$, $0 \leq d \leq 0.5$, $a+b+c+d=1$, $0.005 \leq s \leq 0.3$, and $0.0005 \leq t \leq 0.1$. Hereinafter, Ni, Co, Mn, M, Nb, and Ta may be collectively referred to as "transition metals". In this case, the transition metals may refer to not only all of Ni, Co, Mn, M, Nb, and Ta, but also at least one of Ni, Co, Mn, M, Nb, and Ta. Note, that although Li, Ca, Mg, and Al among the M elements are not actually transition metals, since these elements are arranged in the later described crystal structures within transition metal layers or cation layers including transition metals, the elements will be treated herein as "transition metals". The active material according to the present embodiment may be, for example, an active material for batteries. The active material according to the present embodiment may, for example, be used for a positive electrode.

Figure 1:
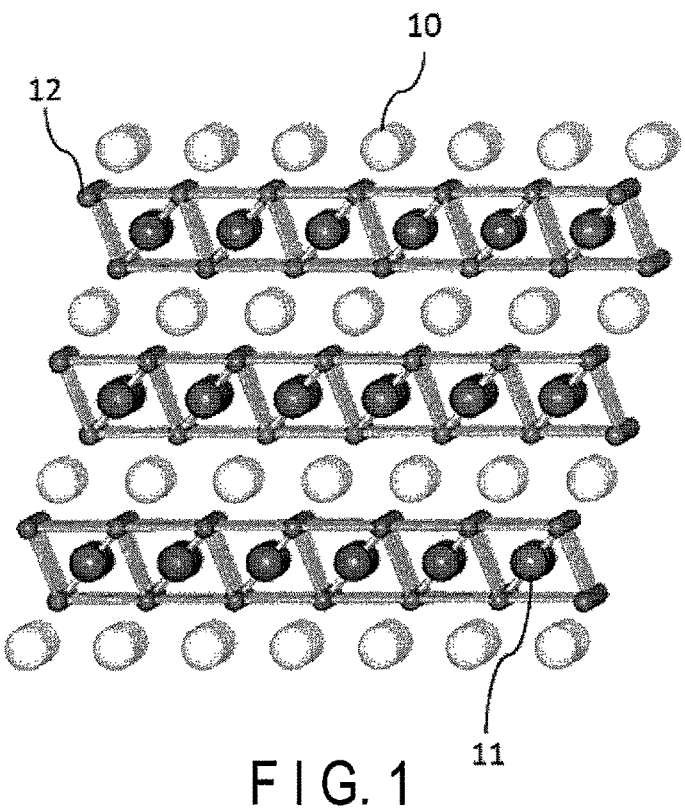
FIG. 1 is a crystal structure conceptual diagram showing a crystal structure belonging to a space group R3/m of an example of an active material according to a first embodiment.
Figure 2:
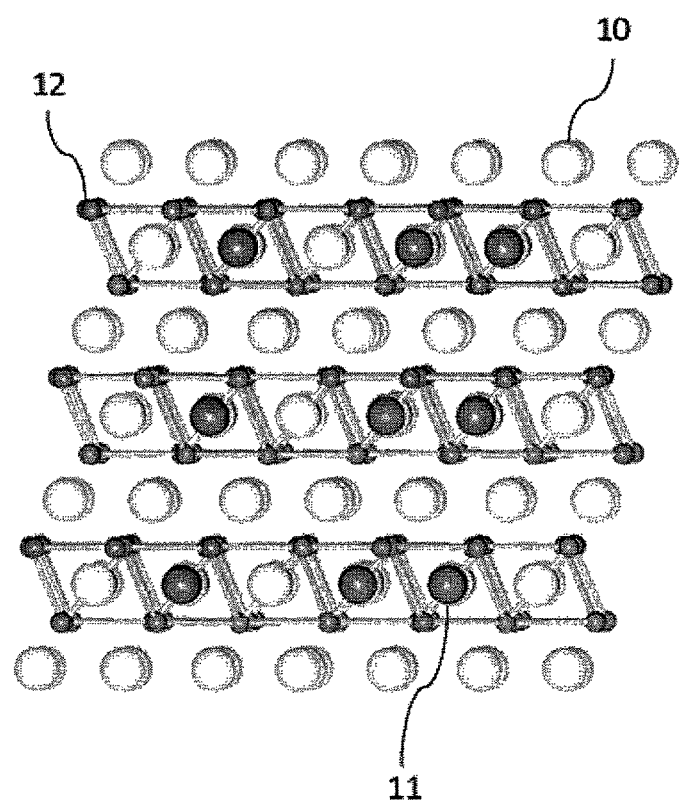
FIG. 2 is a crystal structure conceptual diagram showing a crystal structure belonging to a space group C2/m of an example of the active material according to the first embodiment.
Figure 3:
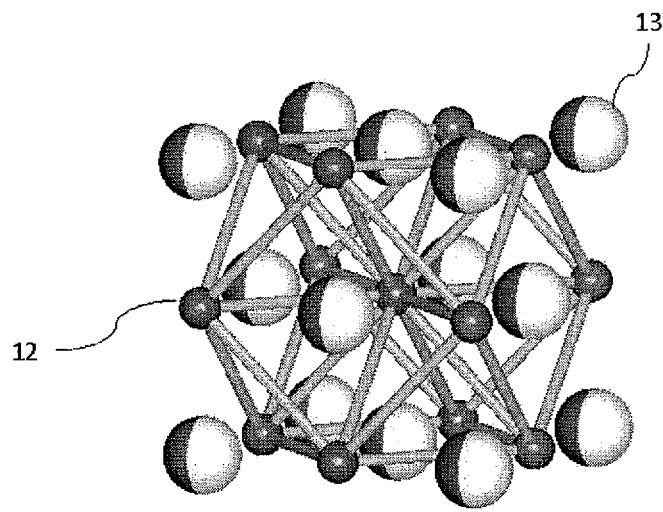
FIG. 3 is a crystal structure conceptual diagram showing a crystal structure belonging to a space group Fm-3m of an example of the active material according to the first embodiment.

The active material according to the present embodiment preferably has a crystal structure that belongs to a space group of anyone of R3/m, C2/m and Fm−3m. The space groups R3/m, C2/m and Fm−3m will be explained with reference to FIG. 1 to FIG. 3. FIG. 1, FIG. 2, and FIG. 3 are crystal structure conceptual diagrams showing crystal structures that belong to the space groups R3/m, C2/m, and Fm−3m, respectively. As shown in FIG. 1 to FIG. 3, the crystal structure that belongs to the space group R3/m or C2/m has a layered structure including lithium layers in which Li 10 are arrayed, transition metal layers in which transition metal 11 are arrayed, and oxygen layers in which oxygen 12 are arrayed. Due to the layered structure described above, lithium ions can be two-dimensionally diffused within the lithium layer, and the in-solid diffusion resistance of lithium ions can be reduced.

With regard to the crystal structure that belongs to the space group R3/m or C2/m for which Ni, Co and Mn are primary constituent elements of the transition metal layer, addition of a transition metal element having a higher valence than those of the primary constituent elements into the transition metal layer improves covalent binding properties between the transition metals and oxygen, thereby improving binding properties between the transition metal layer and the oxygen layer. As a result of adding the transition metal element(s) with higher valence, therefore, the oxygen extraction from the surface of the active material, which is a cause of the capacity degradation, can be suppressed. The transition metal to be added is preferably Nb and Ta. This is because Nb and Ta have a valence of 5 in the crystal structures belonging to the space groups R3/m and C2/m, which is higher than the valence of 2 to 4 for Ni, Co, and Mn. Furthermore, since Nb and Ta have ionic radii that are equivalent to or slightly greater than those of Ni, Co, and Mn, the compatibility of Nb and Ta to the crystal structure is high.

The crystal structure that belongs to the space group Fm−3m includes cation layers in which Li as cations 13 and transition metal are irregularly arranged, and oxygen layers formed of oxygen atoms 12. Since oxidation-reduction reactions of oxide ions occur during charge and discharge, high capacity can be realized. The crystal structure can be kept stable through the use of Nb in the cation layer. Furthermore, the Li diffusion path can be widened by substituting a part of the added Nb with Ta of a greater ion radius, so that the in-solid diffusion resistance can be reduced. If the in-solid diffusion resistance is reduced, the overvoltage during charge and discharge is lowered, and the potential distribution in an electrode becomes small. Accordingly, the life performance of the secondary battery can be improved.

It is preferable that the addition amount s of Nb and Ta falls within a range of $0.005 \leq s \leq 0.3$. If the addition amount s is less than 0.005, the binding properties between the transition metal layer and the oxygen layer cannot be easily improved, since the elemental contents of Nb and Ta within the transition metal layer are low. On the other hand, if the addition amount s of Nb and Ta is greater than 0.3, the capacity will be lowered, since change in valence during charge and discharge hardly occurs for Nb and Ta. It is particularly preferable that the addition amount s of Nb and Ta falls within a range of $0.01 \leq s \leq 0.1$. By setting the addition amount s in the range of $0.01 \leq s \leq 0.1$, it is possible to obtain an active material that can realize a secondary battery, in which reduction of capacity due to substitution by Nb and Ta is little; that is, an active material that can realize a secondary battery of a higher capacity and longer lifetime can be obtained.

Addition of Ta having an ion radius greater than that of Nb results in distortion of an oxygen lattice of the crystal structure, thereby suppressing migration of the transition metals into the lithium layer during charge and discharge, and produces an effect of alleviating the structural transformation of the active material surface into a rock salt structure. Therefore, taking the total amount of added Nb and Ta as 1, it is preferable that the addition amount t of Ta falls within the range of $0.0005 \leq t \leq 0.1$. If the addition amount t is less than 0.0005, distortion of the oxygen lattice is less likely to occur, making it difficult to suppress migration of the transition metals into the lithium layer. If the addition amount t is greater than 0.1, distortion of the oxygen lattice is too large, inhibiting the in-solid diffusion of lithium ions, becoming a factor leading to capacity degradation or reduction in rate performance. A particularly preferable range is $0.001 \leq t \leq 0.01$. By setting the addition amount t in the range of $0.001 \leq t \leq 0.01$, an appropriate degree of oxygen lattice distortion occurs. As a result, an active material that can realize a secondary battery of a higher capacity and longer lifetime can be obtained.

The structural transformation of the active material into a rock salt structure, which is a cause of degradation of capacity during charge and discharge cycles, occurs near the surface of the active material, since the transformation occurs due to side reaction between the electrolyte and transition metals included within the active material. Therefore, the capacity degradation during charge and discharge cycles can be prevented by having a disproportionately large amount of Nb and Ta be present at the active material surface. This, in turn, means that each of the amounts of Nb and Ta present at the surface of the active material according to the present embodiment is greater than that existing inside the active material. Therefore, Nb and Ta may be present in the interior of the active material even if they are disproportionately present at the active material surface.

More specifically, among active materials represented by a general formula $Li_x(Ni_aCo_bMn_cM_d)_{1-s}(Nb_{1-t}Ta_t)_sO_2$ having the same values of s and t, in such a case of having the same amount of Nb and Ta included with respect to the whole of each active material, for an active material having Nb and Ta disproportionately present at the active material surface, because of such bias towards the surface, Nb and Ta exist in smaller amount inside the active material as compared to an active material without the bias towards the active material surface. Namely, in comparison in terms of the general formula $Li_x(Ni_aCo_bMn_cM_d)_{1-s}(Nb_{1-t}Ta_t)_sO_2$, between the s measured at the surface of the active material and the s measured inside the active material, the s at the active material surface is greater (s measured at the active material surface>s measured inside the active material). Therefore, in the active material in which Nb and Ta are biased toward the surface, the capacity degradation is less likely to occur within the active material interior than in the interior of an active material in which Nb and Ta are not biased toward the surface.

Furthermore, due to the disproportionate presence of Nb and Ta at the active material surface, the amount of Nb and Ta present at the active material surface is greater than that in the active material in which Nb and Ta are not disproportionately present at the active material surface. Therefore, the binding property between the transition metal layer and the oxygen layer and the distortion of the oxygen lattice are greater near the surface of the active material for the active material having Nb and Ta disproportionately present at the surface. Therefore, extraction of oxygen atoms and the structural transformation into the rock salt structure accompanying migration of transition metals into the lithium layer, which occur near the active material surface, can be further reduced. Accordingly, the capacity degradation during charge and discharge cycles can be further suppressed.

With regard to the disproportionate presence of Nb and Ta towards the active material surface, it is more preferable that Nb and Ta are intensively present in a region nearer to the surface of the active material. In comparison with the case in which the amount of Nb and Ta gradually decreases from the surface toward the interior of the active material, by having Nb and Ta be more intensively present toward the surface of the active material, there is further reduction in the extraction of oxygen atoms and the structural transformation into a rock salt structure accompanying migration of transition metals into the lithium layer, occurring near the active material surface. Therefore, the capacity degradation during charge and discharge cycles can be further suppressed.

The active material is included in the electrode, for example, in the form of particles. Active material particles may be singular primary particles, secondary particles in which each of the secondary particles are an agglomerate of primary particles, or a mixture of singular primary particles and secondary particles. The shape of primary particles is not particularly limited and, for example, may be a spherical shape, an elliptic shape, a flat shape, a fiber shape, or the like. In the case of a single primary particle, the average primary particle size of the active material is, for example, from 0.5 µm to 15 µm, and preferably, from 1 µm to 10 µm. In the case of an agglomerate of primary particles forming a secondary particle, the average primary particle size of the active material is, for example, 1 µm or smaller, and preferably from 0.05 µm to 0.5 µm.

Disproportionate presence of Nb and Ta toward the active material surface may similarly occur both in the cases of primary particles and secondary particles. This is because, when Nb and Ta are caused to be intensively present toward the surface of the active material of the present embodiment (as will be described later), the shape of the active material is determined depending on whether the active material is formed of primary particles or secondary particles. If a disproportionately large amount of Nb and Ta are present at the surface of the active material that are secondary particles, there may be an uneven presence of Nb and Ta among the primary particles included in the secondary particles. The uneven presence means that, when considering the particle as being a secondary particle, Nb and Ta of primary particles present near the surface of each secondary particle are larger in amount than those of the primary particles present further inside.

Concerning the disproportionate presence of Nb and Ta described above, for an active material having a primary particle size of 3 µm or greater, the "surface" of the active material refers to a region from an outer surface of the active material to less than 1 µm towards the inside. For an active material having a primary particle size of less than 3 µm, the "surface" refers to a region from an outer surface of the active material to 30% relative to the average primary particle size towards the inside. The "interior" of the active material refers to a region that is 1 µm and more inside from the outer surface of the active material, for the active material having a primary particle size of 3 µm or greater. For the active material having a primary particle size of less than 3 µm, the "interior" refers to a region beyond 30% relative to the average primary particle size towards the inside from the outer surface of the active material.

For example, for an active material particle in a state of primary particles having a primary particle size of 3 µm or more, a region from a particle surface thereof to less than 1 µm towards the particle interior is taken as the "surface", and a region further inside is taken as the "interior". In the case of an active material in a state of secondary particles, for example, in the case where the average primary particle size is 3 µm or more, when the whole secondary particle is regarded as a single entity, a region from a surface of the entity to less than 1 µm is taken as the "surface". Namely, a region less than 1 µm inside from particle surfaces facing outside from the secondary particle, among surfaces of primary particles positioned near the surface of the secondary particle, is taken as the "surface" of the secondary particle. The remaining parts of these primary particles positioned near the secondary particle surface, that is, portions including a region 1 µm or more inside from the primary particle surface and regions at sides of primary particle surfaces facing inside the secondary particle, are taken as part of the "interior" of the secondary particle. Whole primary particles, which are positioned inside relative to the primary particles positioned near the secondary particle surface, are also taken as part of the "interior" of the secondary particle. In the case where the average primary particle size of the primary particles included in the secondary particle is less than 3 µm, when the whole secondary particle is regarded as a single entity, a region from a surface of the entity towards the inside up to 30% with respect of the average primary particle size is taken as the "surface".

An example of a method for producing the active material according to the embodiment will be described below.

A starting material containing Li and a starting material containing a transition metal are used. As the starting material containing Li, for example, a salt, such as $Li_2CO_3$, LiOH, and $Li_2SO_4$ or an oxide, such as $Li_2O$ and $Li_2O_2$ may be used. As the starting material containing the transition metal, for example, a salt, an oxide, or the like, containing the transition metal may be used.

The starting material containing the transition metal is weighed so as to be a target element composition ratio, and mixed via a dry method or a wet method. For the dry method, a mixing apparatus, such as a ball mill, is used. For the wet method, for example, a coprecipitation process is used. In the coprecipitation process, an aqueous solution obtained by dissolving the salt containing the transition metal in water is added dropwise into an alkaline aqueous solution, such as aqueous sodium hydroxide or aqueous lithium hydroxide, and a resultant precipitate is filtered and dried to obtain a precursor.

The obtained precursor containing the transition metal is mixed with a starting material containing Li, and fired in air or oxygen atmosphere for 3 to 48 hours at a temperature from 600° C. to 1200° C. Part of the starting material containing the transition metal may be mixed with the starting material containing Li when the starting material containing Li is mixed, and then fired. If the firing is performed at a temperature higher than 1200° C., the obtained active material would have primary particles that have become too large. If the primary particles in the active material are too large, the in-solid diffusion resistance will be high and the rate performance of the secondary battery will be lowered. Such an active material is therefore not preferable. Furthermore, if the primary particles are large, the secondary particles are apt to become fractured in accompany of charge and discharge, which will shorten the cycle life.

In order to have Nb and Ta be present in a disproportionately large amount at the active material surface, starting materials containing transition metals other than Nb and Ta are first mixed through the dry or wet method, and thereafter, the starting material containing Li, the starting material containing Nb, and the starting material containing Ta are mixed in, and the resultant mixture is fired. At this time, the firing temperature is preferably 600° C. or more and less than 950° C. If the firing temperature is lower than 600° C., the reaction between the starting material containing the transition metal and the starting material containing Li may be insufficient. On the other hand, if the firing temperature is 950° C. or higher, elements Nb and Ta may be diffused into the interior of the active material. In such a case, it becomes difficult for the Nb and Ta to be present in disproportionately large amounts on the active material surface.

Whether the active material has the composition of the general formula $Li_x(Ni_aCo_bMn_cM_d)_{1-s}(Nb_{1-t}Ta_t)_sO_2$ can be measured through the following method.

First, a battery including the active material according to the embodiment, for example, is brought into a discharged state. For example, the discharged state of the battery can be achieved by discharging the battery in a 25° C. environment at 0.1 C current to a rated end voltage. Next, the battery in the discharged state is disassembled, and the electrode is taken out. The taken-out electrode is washed, for example, with methyl ethyl carbonate. The electrode, which has been washed as described above, is placed in water, and thereby the electrode active material mixture layer is deactivated in water. The active material can be extracted from the deactivated electrode using, for example, a centrifugation apparatus. The extraction treatment is carried out as follows: for example, when polyvinylidene fluoride (PVdF) is used as a binder, the binder component is removed by washing with, for example, N-methyl-2-pyrrolidone (NMP), and then the electro-conductive agent is removed using a mesh having an adequate aperture. If these components slightly remain, they can be removed by heat treatment in air (e.g., for 30 minutes at 250° C.).

Next, the obtained active material is analyzed by inductively-coupled plasma (ICP) emission spectrometry, thereby measuring Li and the transition metals. Oxygen (O) can be measured by an inert gas fusion-infrared absorption method.

The degree at which the transition metals are disproportionately biased toward the surface of the active material can be measured by Auger electron spectroscopy. At this time, ion etching using rare gas, such as Ar, and Auger electron spectroscopy are repeated for the active material obtained by disassembling a secondary battery, thereby measuring a change in transition metal composition in a depth direction near the surface of the active material.

Measurement of the space group of the active material is performed as follows:

First, the material obtained by the method described above is ground until an average particle size reaches about 5 μm. Even if the original average particle size is less than 5 μm, it is preferable that the sample is subjected to a grinding treatment with a mortar in order to grind apart aggregates. The average particle size can be obtained, for example, by laser diffraction.

The ground sample is filled in a holder portion having a depth of 0.5 mm formed on a glass sample plate. A glass sample plate manufactured by Rigaku Corporation is used as the glass sample plate, for example. At this time, care should be taken to sufficiently fill the holder portion with the sample. Precaution should also be taken to avoid cracking and formation of voids caused by insufficient filling of the sample. Then, another glass plate is used to smoothen the surface of the sample by sufficiently pressing the glass plate against the sample. Upon which, precaution should be taken to avoid too much or too little a filling amount, so as to prevent any rises and dents beyond the reference plane of the glass holder.

Next, the glass plate filled with the sample is set in a powder X-ray diffractometer. And then, an X-ray diffraction pattern (XRD pattern) is obtained using Cu-Kα rays. The XRD pattern obtained here should be applicable to Rietveld analysis. In order to collect data for Rietveld analysis, the step width is made ⅓ to ⅕ of the minimum half width of the diffraction peaks, and the measurement time or X-ray intensity is appropriately adjusted in such a manner that the intensity at the peak position of strongest reflected intensity is 5,000 cps or more.

The XRD pattern obtained as described above is analyzed by the Rietveld method. In the Rietveld method, the diffraction pattern is calculated from a crystal structure model that has been estimated in advance. The parameters of the crystal structure (lattice constant, atomic coordinate, crystal site occupancy, or the like) can be precisely analyzed by fitting all the calculated values with the measured values. Thereby, the characteristics of the crystal structure of the sample compound can be determined. Furthermore, the site occupancy of compositional elements in each of the sites can be determined.

A fitting parameter S is used as the scale for estimating the degree of agreement between the measured intensities and the calculated intensities in Rietveld analysis. Analysis should be performed such that the S value would be less than 1.8. When determining the occupancies in each of the sites, the standard deviation σj must be taken into consideration. The fitting parameter S and standard deviation σj defined herein are estimated using the formula described in "Funmatsu X sen Kaisetsu no Jissai (Reality of Powder X-Ray Analysis)", X-Ray Analysis Investigation Conversazione, The Japan Society for Analytical Chemistry, written and edited by Izumi Nakai and Fujio Izumi (Asakura Publishing Co., Ltd.).

The active material according to the first embodiment is represented by a general formula $Li_x(Ni_aCo_bMn_cM_d)_{1-s}(Nb_{1-t}Ta_t)_sO_2$. Here, M includes one or more elements selected from the group consisting of Li, Ca, Mg, Al, Ti, V, Cr, Zr, Mo, Hf, and W; the active material satisfies $1.0 \leq x \leq 1.3$, $0 \leq a \leq 0.9$, $0 \leq b \leq 1.0$, $0 \leq c \leq 0.8$, $0 \leq d \leq 0.5$, $a+b+c+d=1$, $0.005 \leq s \leq 0.3$, and $0.0005 \leq t \leq 0.1$. With the active material being as such, there can be realized a secondary battery that is high in capacity while having long life.

Second Embodiment

Figure 4:
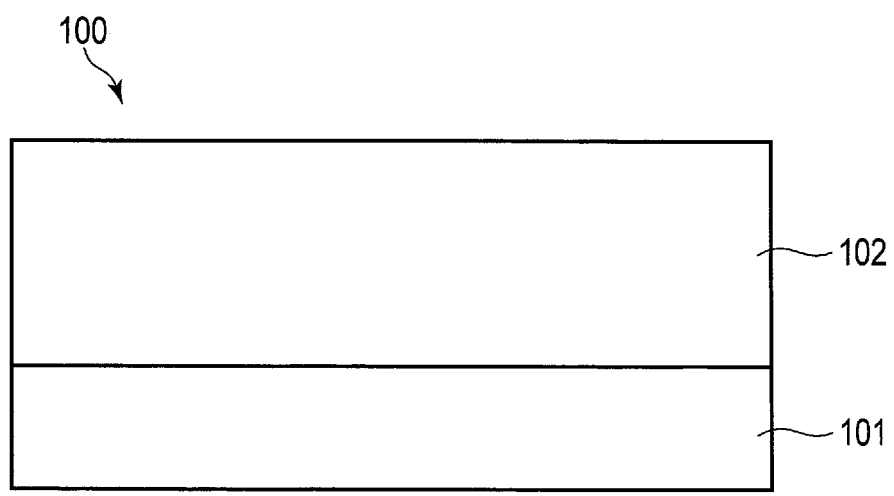
FIG. 4 is a cross-sectional conceptual view showing an electrode according to a second embodiment.

An electrode according to the second embodiment will be described with reference to FIG. 4. FIG. 4 is a cross-sectional conceptual diagram showing the electrode according to the second embodiment.

The electrode 100 comprises a current collector 101 and an active material mixture layer 102 formed on one surface of the current collector 101. The current collector 101 is a positive electrode current collector, and the active material mixture layer 102 is an electrode layer. In the electrode, the active material mixture layer maybe provided on both of reverse surfaces of the current collector. The active material mixture layer includes an active material, an electro-conductive agent, and a binder.

As the active material, for example, the active material according to the first embodiment may be used.

Accordingly, it is possible to provide an electrode that can realize a secondary battery of high capacity and long lifetime.

In addition to the active material according to the first embodiment, the active material mixture layer may further include as the active material, for example, sulfides and other oxides aside of the active material according to the first embodiment. The active material mixture layer may singly include one species of compound as the additional active material, or alternatively, include two or more species of compounds in combination. Examples of the sulfide and oxide include compounds capable of having Li and Li ions be inserted and extracted. Relative to the total amount of active material included in the active material mixture layer, 50% to 100% by mass of the active material according to the first embodiment is preferably included.

Examples of such compounds include manganese dioxides ($MnO_2$), iron oxides, copper oxides, nickel oxides, lithium manganese composite oxides (e.g., $Li_xMn_2O_4$ or $Li_xMnO_2$; $0<x\leq1$), lithium nickel composite oxides (e.g., $Li_xNiO_2$; $0<x\leq1$), lithium cobalt composite oxides (e.g., $Li_xCoO_2$; $0<x\leq1$), lithium nickel cobalt composite oxides (e.g., $Li_xNi_{1-y}Co_yO_2$; $0<x\leq1$, $0<y<1$), lithium manganese cobalt composite oxides (e.g., $Li_xMn_yCo_{1-y}O_2$; $0<x\leq1$, $0<y<1$), lithium manganese nickel composite oxides having a spinel structure (e.g., $Li_xMn_{2-y}Ni_yO_4$; $0<x\leq1$, $0<y<2$), lithium phosphates having an olivine structure (e.g., $Li_xFePO_4$; $0<x\leq1$, $Li_xFe_{1-y}Mn_yPO_4$; $0<x\leq1$, $0<y<1$, and $Li_xCoPO_4$; $0<x\leq1$), iron sulfates [$Fe_2(SO_4)_3$], vanadium oxides (e.g., $V_2O_5$), and lithium nickel cobalt manganese composite oxides ($Li_xNi_{1-y-z}Co_yMn_zO_2$; $0<x\leq1$, $0<y<1$, $0<z<1$, $y+z<1$).

The electro-conductive agent enhances current collection performance of the active material and suppresses contact resistance between the active material and the current collector. Examples of the electro-conductive agent include carbonaceous materials such as acetylene black, carbon black, and graphite.

The binder binds the active material and the electro-conductive agent. Examples of the binder include polytetrafluoroethylene (PTFE), polyvinylidene difluoride (PVdF), polyacrylonitrile (PAN), polymers of polyacrylonitrile, and fluororubber.

The active material, the electro-conductive agent, and the binder in the active material mixture layer are preferably mixed in a ratio of 80% to 95% by mass, 1% to 18% by mass, and 2% to 17% by mass, respectively. With an amount of electro-conductive agent being 1% or more by mass, the above described effects can be demonstrated. With the amount of electro-conductive agent being 18% or less by mass, in a case where a nonaqueous electrolyte is used, for example, decomposition of the nonaqueous electrolyte on the electro-conductive agent surface during high-temperature storage can be diminished. With an amount of binder being 2% or more by mass, sufficient electrode strength can be obtained. With the amount of binder being 17% or less by mass, the amount of the binder, which is an insulating material, mixed in the electrode can be reduced, thereby reducing internal resistance.

The current collector is preferably, for example, an aluminum foil, or an aluminum alloy foil, the aluminum alloy foil including one or more selected from the group consisting of Mg, Ti, Zn, Mn, Fe, Cu, and Si.

The electrode is produced, for example, by suspending the active material, electro-conductive agent, and binder in a commonly used solvent to prepare a slurry, and applying the slurry onto the current collector, drying, and then subjecting to pressing. The electrode may also be produced by forming the active material, electro-conductive agent, and the binder in a pellet shape to be the active material mixture layer, and molding the pellet-shaped electrode active material mixture layer onto the current collector.

The electrode according to the second embodiment includes the active material according to the first embodiment. By being such an electrode, there can be realized a secondary battery with high capacity that has long life.

Third Embodiment

Figure 5:
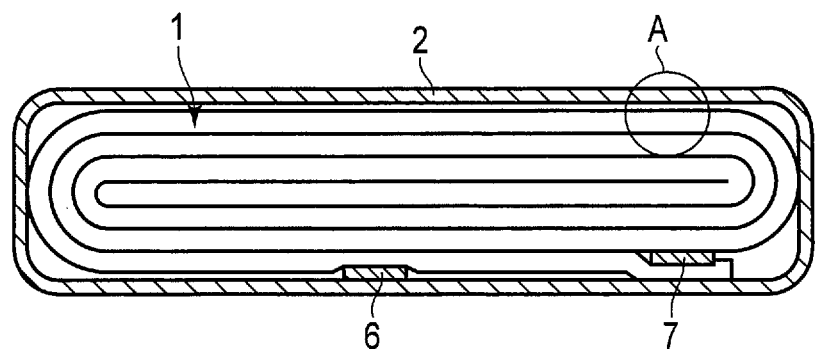
FIG. 5 is a cross-sectional view schematically showing an example of a secondary battery according to a third embodiment.

A secondary battery according to the third embodiment will be described with reference to FIG. 5. FIG. 5 is a schematic cross-sectional diagram showing an example of a secondary battery according to the third embodiment.

The secondary battery according to the third embodiment includes a container member; a positive electrode housed in the container member; a negative electrode including a negative electrode active material, the negative electrode being housed in the container member such that the negative electrode is spatially separated from the positive electrode, for example, with a separator interposed therebetween; and an electrolyte filled in the container member.

Figure 6:
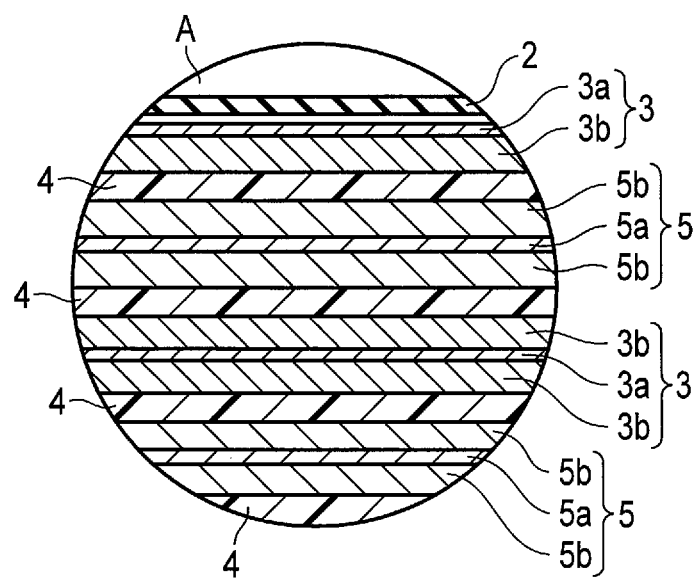
FIG. 6 is an enlarged cross-sectional view of section A of the secondary battery shown in FIG. 5.

More detailed explanation will be made with reference to FIGS. 5 and 6 showing an example of the secondary battery according to the third embodiment. FIG. 5 is a cross-sectional view showing a flat secondary battery with a container member 2 made of laminate film, and FIG. 6 is an enlarged cross-sectional view of section A in FIG. 5. Each drawing is a typical view for description; although there are parts different from an actual apparatus (i.e., a battery) in shape, dimension, and ratio, these structural designs may be properly changed taking the following explanations and known technologies into consideration.

The flat secondary battery is configured with a wound electrode group 1, a bag-form container member 2, a negative electrode terminal 6, and a positive electrode terminal 7.

The flat wound electrode group 1 is housed in the bag-form container member 2 made of a laminate film in which an aluminum foil is interposed between two resin layers. The flat wound electrode group 1 is formed by spirally winding and pressing a stack, in which a negative electrode 3, a separator 4, a positive electrode 5, and another separator 4 are stacked, such that these members of the stack would be arranged in this order from the outer side. A portion of the negative electrode 3 at the outermost layer has a configuration, in which, as shown in FIG. 6, a negative electrode active material mixture layer 3b is formed on one inner side of a negative electrode current collector 3a. The other portions of the negative electrodes 3 are configured with a negative electrode active material mixture layer 3b formed on both of reverse sides of the negative electrode current collector 3a. The positive electrode 5 is configured with a positive electrode active material mixture layer 5b formed on both of reverse sides of a positive electrode current collector 5a.

Near an outer circumference of the wound electrode group 1, a negative electrode terminal 6 is electrically connected to the negative electrode current collector 3a at the portion of the negative electrode 3 at the outermost layer, and a positive electrode terminal 7 is electrically connected to the positive electrode current collector 5a of the positive electrode 5 at a portion on the inner side. The negative electrode terminal 6 and the positive electrode terminal 7 extend out from an opening in the bag-form container member 2. For example, an electrolyte is put-in through the opening of the bag-form container member 2. The wound electrode group 1 and the electrolyte are fully sealed in by heat-sealing the opening in the bag-form container 2, sandwiching the negative electrode terminal 6 and the positive electrode terminal 7 in between.

Examples of materials for the negative electrode terminal 6 include aluminum or an aluminum alloy, the aluminum alloy including one or more selected from the group consisting of Mg, Ti, Zn, Mn, Fe, Cu, and Si. The negative electrode terminal 6 is preferably formed from the same material as that of the negative electrode current collector 3a, to reduce the contact resistance with the negative electrode current collector 3a.

For the positive electrode terminal 7, there may be used a material having electrical stability in a potential range of 3 V to 4.25 V (vs. Li/Li+) with respect to lithium ion metal, and at the same time, having electrical conductivity. Specific examples include aluminum or an aluminum alloy, the aluminum alloy including one or more selected from the group consisting of Mg, Ti, Zn, Mn, Fe, Cu, and Si. The positive electrode terminal 7 is preferably formed from the same material as that of the positive electrode current collector 5a, to reduce the contact resistance with the positive electrode current collector 5a.

Hereinafter, the container member 2, negative electrode 3, the positive electrode 5, separator 4, and electrolyte, which are constituent members of the secondary battery, will be described in detail.

1) Container Member

The container member 2 is formed of, for example, a laminate film having a. thickness of 0.5 mm or less. Alternatively, a metal container having a wall thickness of 1.0 mm or less, for example, may be used as the container member. The metal container more preferably has a wall thickness of 0.5 mm or less.

The shape of the container member 2 may be selected from, for example, flat type (thin type), angular type, cylinder type, coin type, and button type. Examples of the container member include, according to the battery dimension, a small battery container member for mounting on mobile electronic appliances or the like, and a large battery container member for mounting on a two-wheeled to four-wheeled vehicle or the like.

As the laminate film, there may be used a multilayer film including resin layers and metal layer sandwiched between the resin layers. The metal layer is preferably aluminum foil or aluminum alloy foil, in order to reduce weight. The resin layer may be made of, for example, a polymer material such as polypropylene (PP), polyethylene (PE), nylon, or polyethylene terephthalate (PET). The laminate film can be formed into the shape of the container member by heat sealing.

The metal container is made of, for example, aluminum or aluminum alloy. The aluminum alloy is preferably an alloy including elements such as magnesium, zinc, or silicon. When the alloy includes a transition metal such as iron, copper, nickel, or chromium, the amount of the transition metal is preferably 100 ppm by mass or less.

2) Negative Electrode

The negative electrode 3 may include a negative electrode current collector 3a, and a negative electrode active material mixture layer 3b formed on one face or both of reverse faces of the negative electrode current collector 3a, the negative electrode active material mixture layer 3b including a negative electrode active material, an electro-conductive agent, and a binder.

There may be used for the negative electrode current collector, a material which is electrochemically stable at the potential at which lithium (Li) is inserted into and extracted from the negative electrode active material. The negative electrode current collector is preferably made of copper, nickel, stainless steel, aluminum, or an aluminum alloy including one or more elements selected from the group consisting of Mg, Ti, Zn, Mn, Fe, Cu, and Si. The thickness of the negative electrode current collector is preferably from 5 μm to 20 μm. The negative electrode current collector having such a thickness can maintain balance between the strength and weight reduction of the negative electrode.

The negative electrode active material is included in the negative electrode, for example, in the form of particles.

Negative electrode active material particles may be singular primary particles, secondary particles in which each of the secondary particles are an agglomerate of primary particles, or a mixture of singular primary particles and secondary particles. From the perspective of achieving high density, the negative electrode active material mixture layer preferably includes primary particles at a proportion of 5% to 50% by volume. The shape of primary particles is not particularly limited and, for example, may be a spherical shape, an elliptic shape, a flat shape, a fiber shape, or the like.

Examples of the negative electrode active material include a carbon material, a graphite material, a lithium alloy material, a metal oxide, and a metal sulfide. In particular, it is preferable to select a negative electrode active material of at least one titanium-containing oxide selected from the group consisting of a lithium-titanium oxide, a titanium oxide, a niobium-titanium oxide, a lithium sodium niobium-titanium oxide $Li_{2+v}Na_{2-w}M1_xTi_{6-y-z}Nb_yM2_zO_{14+\delta}$ (where M1 includes at least one selected from the group consisting of Cs, K, Sr, Ba, and Ca, M2 includes at least one selected from the group consisting of Zr, Sn, V, Ta, Mo, W, Fe, Co, Mn, Al, $0 \leq v \leq 4$, $0 < w < 2$, $0 \leq x < 2$, $0 < y < 6$, $0 \leq z < 3$, $y+z<6$ and $-0.5 \leq \delta \leq 0.5$), for which the potentials at which Li ions are inserted and extracted is 1 V to 3 V (vs. Li/Li+) with reference to the lithium potential.

Examples of the lithium-titanium oxide include a spinel-structured lithium titanium oxide represented by a general formula $Li_{4+x}Ti_5O_{12}$ ($-1 \leq x \leq 3$) and ramsdellite structure lithium titanium oxide represented by a general formula $Li_{2+x}Ti_3O_7$ ($0 \leq x \leq 3$), and lithium-titanium oxides like $Li_{1+x}Ti_2O_4$ ($0 \leq x \leq 1$), $Li_{1.1+x}Ti_{1.8}O_4$ ($0 \leq x \leq 1$) $Li_{1.07+x}Ti_{1.86}O_4$ ($0 \leq x \leq 1$), and $Li_xTiO_2$ ($0 \leq x \leq 1$). Examples of the titanium oxide include a monoclinic crystal structure titanium oxide represented by a general formula $Li_xTiO_2$ ($0 \leq x \leq 1$) (TiO$_2$ (B) as a structure before charging), a rutile structure titanium oxide, and an anatase structure titanium oxide (TiO$_2$ as a structure before charging). The niobium-titanium oxide is represented by $Li_aTiM_bNb_{2+\beta}O_{7\pm\sigma}$ ($0 \leq a \leq 5$, $0 \leq b \leq 0.3$, $0 \leq \beta \leq 0.3$, $0 \leq \sigma \leq 0.3$, M is at least one selected from the group consisting of Fe, V, Mo, and Ta). One of these may be used alone or they may be used as a mixture. Preferable is a spinel-structured lithium titanium oxide represented by a general formula $Li_{4+x}Ti_5O_{12}$ ($-1 \leq x \leq 3$), for which change in volume is very small. By using the titanium-containing oxides described above, aluminum foil instead of copper foil can be used as the negative electrode current collector. As a result, the weight and cost can be reduced. Furthermore, use of the titanium-containing oxides described above is advantageous in an electrode structure of bipolar structure.

The negative electrode active material particles desirably have an average particle size of 1 μm or less, and simultaneously have a specific surface area within a range of from 3 $m^2$/g to 200 $m^2$/g, as determined by a BET method employing $N_2$ adsorption. By having such a specific surface area, the affinity between the negative electrode and the electrolyte can be made high.

The specific surface area of the negative electrode is specified in the above range for the following reasons. In the negative electrode having a specific surface area smaller than 3 $m^2$/g, agglomeration of particles is prominent, making affinity between the negative electrode and the electrolyte low, which makes interfacial resistance of the negative electrode high. As a result, the output performance and the charge and discharge cycle performance are low. On the other hand, in the negative electrode having a specific surface area larger than 50 $m^2$/g, the distribution of the electrolyte tends to lean towards the negative electrode, which may invoke electrolyte insufficiency at the positive electrode. Accordingly, the output performance and the charge and discharge cycle performance cannot be improved. More preferably, the specific surface area is from 5 $m^2$/g to 50 $m^2$/g. The specific surface area of the negative electrode means a surface area per gram of the negative electrode active material mixture layer (excluding the weight of the current collector). The negative electrode active material mixture layer is a porous layer including the negative electrode active material, the electro-conductive agent, and the binder, which is supported on the current collector.

A preferable range of the porosity of the negative electrode (excluding the current collector) is from 20% to 50%. In this range, the negative electrode both excellent in affinity with the electrolyte and is of high density can be obtained. A particularly preferable range of the porosity is from 25% to 40%.

As the electro-conductive agent, for example, a carbon material may be used. Examples of the carbon material include acetylene black, carbon black, cokes, carbon fiber, graphite, aluminum powder, TiO, and the like. More preferably, a powder of the cokes, graphite, or TiO having an average particle diameter of 10 μm or less, or the carbon fiber having an average fiber diameter of 1 μm or less, in which a heat treatment temperature is from 800° C. to 2000° C., is preferred. With regard to these carbon materials, the specific surface area measured by a BET method by $N_2$ adsorption is preferably 10 $m^2$/g or more.

Examples of the binder may include polytetrafluoroethylene (PTFE), polyvinylidene fluoride (PVdF), fluorine-based rubber, styrene butadiene rubber, core shell binder, and the like.

Regarding a mixing ratio of the active material, electro-conductive agent, and binder in the negative electrode, the negative electrode active material is preferably in a range of from 80% by weight to 95% by weight, the electro-conductive agent is preferably in a range of from 3% by weight to 18% by weight, and the binder is preferably in a range of from 2% by weight to 7% by weight. The negative electrode 3 is produced, for example, by suspending the negative electrode active material, electro-conductive agent, and binder in a commonly used solvent to prepare a slurry, and applying the slurry onto the negative electrode current collector 3a, drying, and then subjecting to pressing. The negative electrode 3 may also be produced by forming the active material, electro-conductive agent, and the binder in a pellet shape to be the negative electrode active material mixture layer 3b, and molding the pellet-shaped negative electrode active material mixture layer 3b onto the negative electrode current collector 3a.

3) Positive Electrode

As the positive electrode 5, the electrode according to the second embodiment can be used. Therefore, since details are described with regard to the electrode according to the second embodiment, the details are omitted.

By using this positive electrode, there can be provided a battery of high capacity and long life.

4) Electrolyte

As the electrolyte, there may be used, for example, a liquid nonaqueous electrolyte prepared by dissolving a first electrolyte in an organic solvent or a gel-form nonaqueous electrolyte that is a composite of a liquid electrolyte and a polymeric material. There also maybe used as the electrolyte, an electrolyte including an aqueous solvent and a second electrolyte, or a gel-form electrolyte that is a composite of this electrolyte and a polymeric material.

The liquid nonaqueous electrolyte is preferably prepared by dissolving the first electrolyte in an organic solvent at a concentration of 0.5 M to 2.5 M.

Examples of the first electrolyte include lithium salts such as lithium perchlorate ($LiClO_4$), lithium hexafluorophosphate ($LiPF_6$), lithium tetrafluoroborate ($LiBF_4$), lithium hexafluoroarsenate ($LiAsF_6$), lithium trifluoromethane-sulfonate ($LiCF_3SO_3$), lithium bis-trifluoromethylsulfonylimide [$LiN(CF_3SO_2)_2$], or mixtures thereof. The electrolyte is preferably difficult to oxidize, even at a high potential, and $LiPF_6$ is particularly preferable.

Examples of the organic solvent include cyclic carbonates such as propylene carbonate (PC), ethylene carbonate (EC), and vinylene carbonate; linear carbonates such as diethyl carbonate (DEC), dimethyl carbonate (DMC), and methyethyl carbonate (MEC); cyclic ethers such as tetrahydrofuran (THF), 2-methyl tetrahydrofuran (2MeTHF), and dioxolane (DOX); linear ethers such as dimethoxy-ethane (DME) and diethoxyethane (DEE); as well as γ-butyrolactone (GBL), acetonitrile (AN), and sulfolane (SL). These organic solvents may be used alone or in a form of mixed solvents.

Examples of the polymeric material include polyvinylidene difluoride (PVdF), polyacrylonitrile (PAN), and polyethylene oxide (PEO).

A preferable organic solvent is a mixed solvent, in which at least two selected from a group consisting of propylene carbonate (PC), ethylene carbonate (EC), and diethyl carbonate (DEC) are mixed, or a mixed solvent including γ-butyrolactone (GBL). By using these mixed solvents, a nonaqueous electrolyte secondary battery with excellent high-temperature performance can be obtained.

As the aqueous solvent, a solution including water may be used. Here, the solution including water may be pure water, or alternatively, a mixed solution or a mixed solvent of water and materials other than water.

In an aqueous electrolyte, the amount of water solvent (for example, amount of water in the aqueous solvent) is preferably 1 mol or more, based on 1 mol of salt as solute. The amount of water solvent is more preferably 3.5 mol or more, based on 1 mol of salt as solute.

As the second lithium salt, there may be used a substance that becomes dissociated and thus generates an anion when the substance is dissolved in an aqueous solvent. In particular, preferable are lithium salts that dissociate into Li ion(s) and the anion. Such lithium salts include, for example, $LiNO_3$, LiCl, $Li_2SO_4$, LiOH, and the like.

The lithium salt that dissociates into Li ion(s) and the anion has a relatively high solubility in aqueous solvents. For that reason, there can be obtained an electrolyte, in which the anion concentration is of a high concentration of from 1 M to 10 M, and thus having favorable Li ion diffusibility.

An electrolyte containing $NO_3^-$ and/or $Cl^-$ may be used in a wide anion concentration range of about 0.1 M to 10 M. From the perspective of fulfilling both ion conductivity and lithium equilibrium potential, the anion concentration is preferably of a high concentration of from 3 M to 12 M. It is more preferable that the anion concentration of the electrolyte containing $NO_3^-$ or $Cl^-$ is from 8 M to 12 M.

An electrolyte containing $LiSO_4^-$ and/or $SO_4^{2-}$ may be used in an anion concentration range of about 0.05 M to 2.5 M. From the perspective of ion conductivity, the anion concentration is preferably of a high concentration of from 1.5 M to 2.5 M.

The $OH^-$ concentration in the electrolyte is desirably from $10^{-10}$ M to 0.1 M. The electrolyte may contain at least one anion selected from the group consisting of $NO_3^-$, $Cl^-$, $LiSO_4^-$, $SO_4^{2-}$, and $OH^-$.

The containing of water in the aqueous electrolyte can be examined by GC-MS (Gas Chromatography-Mass Spectrometry) In addition, the salt concentration and the water content in the aqueous electrolyte can be measured by, for example, ICP (Inductively Coupled Plasma) emission spectrometry. The molar concentration (mol/L) can be calculated by measuring a predetermined amount of aqueous electrolyte and calculating the concentration of contained salt. In addition, the number of moles of the solute and the solvent can be calculated by measuring the specific gravity of the aqueous electrolyte.

5) Separator

As the separator 4, there may be used a porous film or a nonwoven fabric made of synthetic resin formed from a material such as polyethylene, polypropylene, cellulose, or polyvinylidene difluoride (PVdF). A preferable porous film is made of polyethylene or polypropylene, which melts at a fixed temperature and can thus shut off a current, and is therefore able to enhance safety.

The above described secondary battery according to the embodiment includes the positive electrode that includes the active material according to the first embodiment as the positive electrode active material, and therefore, there can be provided a secondary battery having high capacity and excellent charge and discharge cycle performance.

Fourth Embodiment

Figure 8:
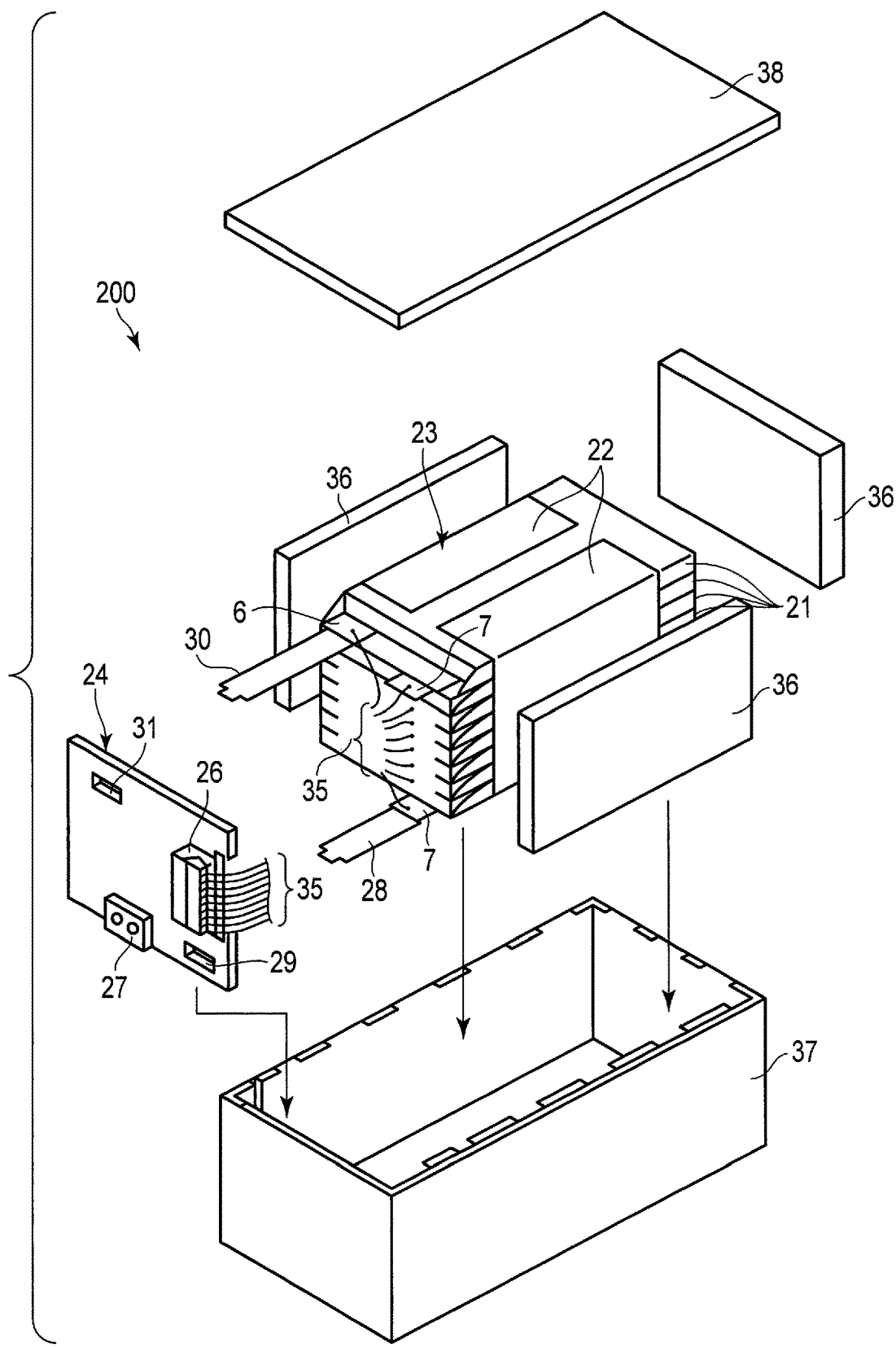
FIG. 8 is an exploded perspective view schematically showing an example of a battery pack according to the fourth embodiment.

A battery module and a battery pack according to a fourth embodiment will be explained in detail using FIGS. 7 and 8. FIG. 7 is a perspective view schematically showing an example of a battery module according to the fourth embodiment. FIG. 8 is an exploded perspective view schematically showing an example of the battery pack according to the fourth embodiment.

The battery module and battery pack according to the fourth embodiment each include one or more secondary batteries (i.e, single-batteries) according to the third embodiment described above. When plural single-batteries are included in the battery module or battery pack, the single-batteries are arranged such that each of the single-batteries are electrically connected with one another in series, in parallel, or in a combination of in-series and in-parallel.

The battery module 23 and battery pack 200 will concretely be described with reference to FIGS. 7 to 9. In the battery module 23 shown in FIG. 7 and the battery pack 200 shown in FIG. 8, the flat battery shown in FIG. 5 may be used as a single-battery 21.

In the battery module 23 shown in FIG. 7, the single-batteries 21 are electrically connected via leads 20 (bus bars). Each lead 20 connects, for example, a negative electrode terminal 6 of one single-battery 21 and a positive electrode terminal 7 of the single-battery 21 positioned adjacent. In such a manner, plural single-batteries 21 are thus connected in series by plural leads 20. Although no example is depicted in drawing, in a battery module including plural single-batteries that are electrically connected in parallel, for example, the plural single-batteries may be electrically connected by having plural negative electrodes being connected to each other by leads while having plural positive electrodes being connected to each other by leads.

The positive electrode terminal 7 of at least one battery among the plural single-batteries 21 is electrically connected to a positive electrode-side lead 28 for external connection. In addition, the negative electrode terminal 6 of at least one battery among the single-batteries 21 is electrically connected to a negative electrode-side lead 30 for external connection.

In the battery pack 200 shown in FIG. 8, plural single-batteries 21 are stacked such that externally projecting negative electrode terminals 6 and positive electrode terminals 7 are aligned in the same direction, and the single-batteries 21 are fastened by an adhesive tape 22 to configure a battery module 23. As shown in FIG. 9, these single-batteries 21 are electrically connected in series to each other.

A printed wiring board 24 is arranged facing towards the side surface of the single-batteries 21, from which the negative electrode terminals 6 and the positive electrode terminals 7 project. As shown in FIGS. 8 and 9, a thermistor 25, a protective circuit 26, and an external power distribution terminal 27 are mounted on the printed wiring board 24. In addition, an electrically insulating plate (not shown) is mounted on the surface of the printed wiring board 24 (protective circuit board) facing toward the battery module 23 to avoid unnecessary connection with wiring of the battery module 23.

A positive electrode-side lead 28 is connected to the positive electrode terminal 7 positioned lowermost in the battery module 23. A distal end of the positive electrode-side lead 28 is inserted into a positive electrode connector 29 of the printed wiring board 24, thereby electrically connecting the positive electrode-side lead 28 to the printed wiring board 24. A negative electrode-side lead 30 is connected to the negative electrode terminal 6 positioned uppermost in the battery module 23. A distal end of the negative electrode-side lead 30 is inserted into a negative electrode connector 31 of the printed wiring board 24, thereby electrically connecting the negative electrode-side lead 30 to the printed wiring board 24. The connectors 29 and 31 are connected to the protective circuit 26 via wirings 32 and 33 formed on the printed wiring board 24.

Figure 9:
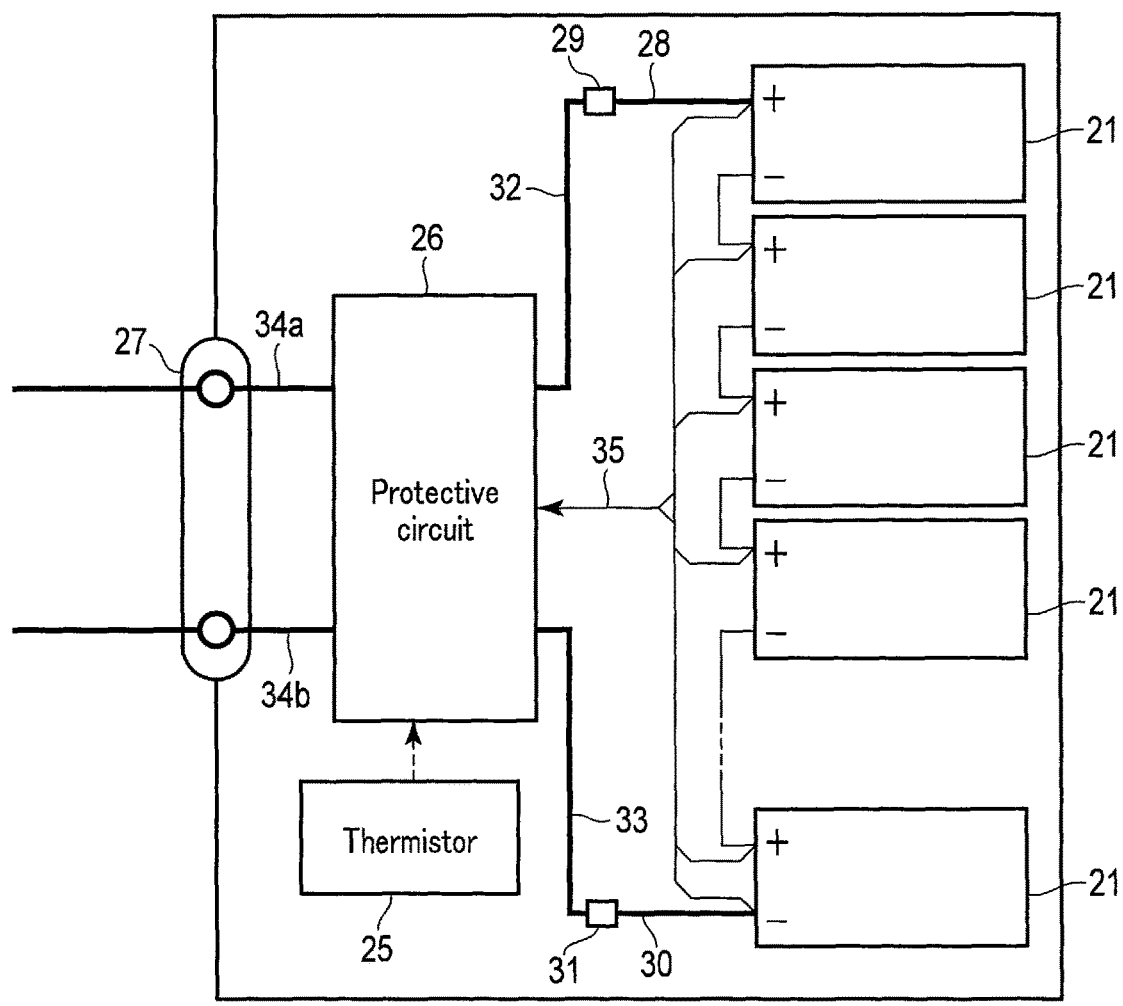
FIG. 9 is a block diagram showing an example of an electric circuit of the battery pack shown in FIG. 8.

FIG. 9 is a block diagram showing the electric circuit of the battery pack of FIG. 8. Explaining with reference to FIG. 9, the thermistor 25 detects the temperature(s) of the single-battery(s) 21. A signal of the detection is sent to the protective circuit 26. The protective circuit 26 can close-off a positive-side wiring 34a and a negative-side wiring 34b between the protective circuit 26 and the external power distribution terminal 27 under a predetermined condition. The predetermined condition is, for example, when the temperature detected by the thermistor 25 rises to a predetermined temperature or higher. The predetermined condition is also one when an over-charge, an over-discharge, or an over-current of the single-battery(s) 21 is detected. The over-charge or the like is detected for each individual single-battery 21 or all the single-batteries 21 as a whole. When each individual single-battery 21 is detected, the battery voltage may be detected, or the positive electrode potential or negative electrode potential may be detected. In the latter case, a lithium electrode used as a reference electrode is inserted into each of the individual single-batteries 21. In the case of FIGS. 8 and 9, a wire 35 for voltage detection is connected to each of the single-batteries 21, and signals of detection are sent to the protective circuit 26 through these wires 35.

A protective sheet 36 made of rubber or resin is arranged on each of three side surfaces of the battery module 23 excluding the side surface from which the positive electrode terminal 7 and the negative electrode terminal 6 project.

The battery module 23 is housed in a housing container 37 together with each of the protective sheets 36 and the printed wiring board 24. Namely, the protective sheets 36 are each arranged on both inner side surfaces along a long-side direction and an inner side surface along a short-side direction of the housing container 37. The printed wiring board 24 is arranged on an inner side surface opposite to the protective sheet 36 that is arranged along the short-side direction. The battery module 23 is positioned in a space surrounded by the protective sheets 36 and the printed wiring board 24. A cover 38 is mounted on the top surface of the housing container 37.

Instead of the adhesive tape 22, a heat-shrinkage tape may be used to fix the battery module 23. In this case, the protective sheets are arranged on both side surfaces of the battery module, and after the heat-shrinkage tape is wound around the battery module and protective sheets, the heat-shrinkage tape is allowed to heat-shrink to bind the battery module together.

While FIGS. 7 to 9 show embodiments in which the single-batteries 21 are connected in series, the single-batteries may be connected in parallel or the connection in series and in parallel may be combined, to increase the battery capacity. In addition, assembled battery packs may further be connected in series or in parallel.

According to the embodiment described above, a battery module or a battery pack having high capacity and excellent charge and discharge cycle performance can be provided by including the secondary battery from the above described third embodiment having high capacity and excellent charge and discharge cycle performance.

While the battery module 23 shown in FIG. 7 and the battery pack 200 shown in FIG. 8 include plural single-batteries 21, the battery module and battery pack according to the fourth embodiment may each include one single-battery 21.

The embodiment of the battery pack is appropriately changed in accordance with its use. The battery pack according to the embodiment is favorably used in applications where excellent cycle performance is demanded when a large current is extracted. Specifically, the battery pack can also be used as a power supply for digital cameras.

Fifth Embodiment

According to a fifth embodiment, a vehicle is provided. The battery pack according to the fourth embodiment is installed on this vehicle.

In the vehicle according to the fifth embodiment, the battery pack is configured, for example, to recover regenerative energy from motive force of the vehicle. The vehicle may include a mechanism (e.g., a regenerator) configured to convert kinetic energy of the vehicle into regenerative energy.

Examples of the vehicle according to the fifth embodiment include two to four-wheeled hybrid electric automobiles, two to four-wheeled electric automobiles, electric assist bicycles, and railway cars.

In the vehicle according to the fifth embodiment, the installing position of the battery pack is not particularly limited. For example, the battery pack may be installed in the engine compartment of the vehicle, in rear parts of the vehicle, or under seats.

An example of the vehicle according to the fifth embodiment is explained below, with reference to the drawings.

Figure 10:
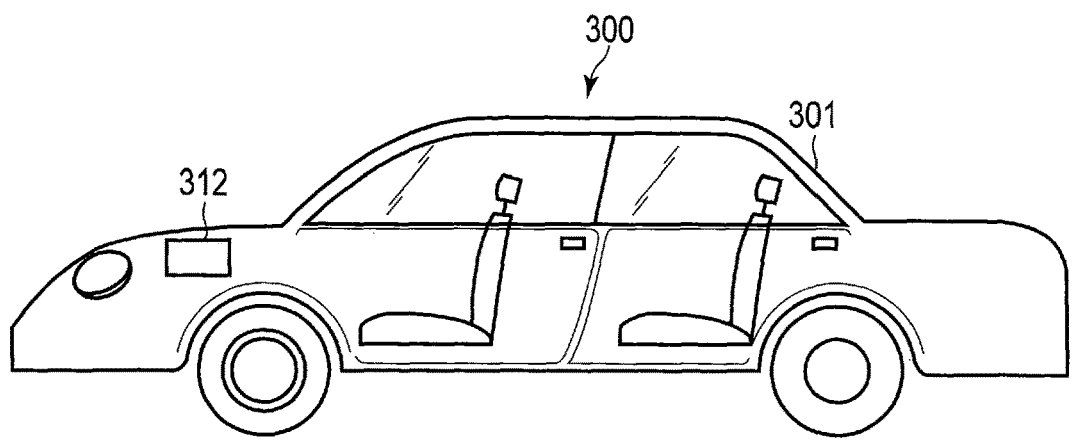
FIG. 10 is a cross-sectional view schematically showing an example of a vehicle according to a fifth embodiment.

FIG. 10 is a cross-sectional view schematically showing an example of a vehicle according to the fifth embodiment.

A vehicle 300, shown in FIG. 10 includes a vehicle body 301 and a battery pack 312. The battery pack 312 may be the battery pack according to the fourth embodiment.

The vehicle 300, shown in FIG. 10, is a four-wheeled automobile. As the vehicle 300, for example, a two- to four-wheeled hybrid electric automobile, a two- to four-wheeled electric automobile, a power-assisted bicycle, or railway car may be used.

The vehicle 300 may include plural battery packs 302. In that case, the battery packs 302 may be electrically connected to each other in series or in parallel. The electrical connection may be a combination of the connection in series and the connection in parallel.

The battery pack 312 is installed in an engine compartment located at the front of the vehicle body 301. The position at which the battery pack 312 is installed is not particularly limited. The battery pack 312 may be installed in rear sections of the vehicle body 301, or under a seat. The battery pack 312 may be used as a power source of the vehicle 300. The battery pack 312 can also recover regenerative energy of motive force of the vehicle 300.

Next, with reference to FIG. 11, an aspect of operation of the vehicle according to the fifth embodiment is explained.

FIG. 11 is a view schematically showing another example of the vehicle according to the fifth embodiment. A vehicle 300, shown in FIG. 11, is an electric automobile.

The vehicle 300 shown in FIG. 11 includes a vehicle body 301, a vehicle power source 302, a vehicle ECU (electric control unit) 380, which is a master controller of the vehicle power source 302, an external terminal (an external power connection terminal) 370, an inverter 340, and a drive motor 345.

The vehicle 300 includes the vehicle power source 302, for example, in an engine compartment, in the rear sections of the automobile body, or under a seat. In FIG. 11, the position of the vehicle power source 302 installed in the vehicle 300 is schematically shown.

The vehicle power source 302 includes plural (for example, three) battery packs 312a, 312b and 312c, BMU (a battery management unit) 311, and a communication bus 310.

The three battery packs 312a, 312b and 312c are electrically connected to each other in series. The battery pack 312a includes a battery module 314a and a battery module monitoring unit (VTM: voltage temperature monitoring) 313a. The battery pack 312b includes a battery module 314b, and a battery module monitoring unit 313b. The battery pack 312c includes a battery module 314c, and a battery module monitoring unit 313c. The battery packs 312a, 312b and 312c can each be independently removed, and may be exchanged by a different battery pack 312.

Each of the battery modules 314a to 314c includes plural single-batteries connected in series. At least one of the plural single-batteries is the secondary battery according to the third embodiment. The battery modules 314a to 314c each perform charging and discharging through a positive electrode terminal 316 and a negative electrode terminal 317.

In order to collect information concerning security of the vehicle power source 302, the battery management unit 311 performs communication with the battery module monitoring units 313a to 313c and collects information such as voltages or temperatures of the single-batteries included in the battery modules 314a to 314c included in the vehicle power source 302.

The communication bus 310 is connected between the battery management unit 311 and the battery module monitoring units 313a to 313c. The communication bus 310 is configured so that multiple nodes (i.e., the battery management unit and one or more battery module monitoring units) share a set of communication lines. The communication bus 310 is, for example, a communication bus configured based on CAN (Control Area Network) standard.

The battery module monitoring units 313a to 313c measure voltage and temperature of each single-battery in the battery modules 314a to 314c based on communications from the battery management unit 311. It is possible, however, to measure the temperatures only at several points per battery module and the temperatures of all of the single-batteries need not be measured.

The vehicle power source 302 may also have an electromagnetic contactor (for example, a switch unit 333 shown in FIG. 11) for switching connection between the positive electrode terminal 316 and the negative electrode terminal 317. The switch unit 333 includes a precharge switch (not shown), which is turned on when the battery modules 314a to 314c are charged, and a main switch (not shown), which is turned on when battery output is supplied to a load. The precharge switch and the main switch include a relay circuit (not shown), which is turned on or off based on a signal supplied to a coil located near a switch element.

The inverter 340 converts an inputted direct current voltage to a three-phase alternate current (AC) high voltage for driving a motor. Three-phase output terminal(s) of the inverter 340 is (are) connected to each three-phase input terminal of the drive motor 345. The inverter 340 controls an output voltage based on control signals from the battery management unit 311 or the vehicle ECU 380, which controls the entire operation of the vehicle.

The drive motor 345 is rotated by electric power supplied from the inverter 340. The rotation is transferred to an axle and driving wheels W, for example, through a differential gear unit.

The vehicle 300 also includes a regenerative brake mechanism (a regenerator), which is not shown though. The regenerative brake mechanism rotates the drive motor 345 when the vehicle 300 is braked, and converts kinetic energy into regenerative energy in the form of electric energy. The regenerative energy, recovered in the regenerative brake mechanism, is inputted into the inverter 340 and converted to direct current. The direct current is inputted into the vehicle power source 302.

One terminal of a connecting line L1 is connected through a current detector (not shown) in the battery management unit 311 to the negative electrode terminal 317 of the vehicle power source 302. The other terminal of the connecting line L1 is connected to a negative electrode input terminal of the inverter 340.

One terminal of a connecting line L2 is connected through the switch unit 333 to the positive electrode terminal 316 of the vehicle power source 302. The other terminal of the connecting line L2 is connected to a positive electrode input terminal of the inverter 340.

The external terminal 370 is connected to the battery management unit 311. The external terminal 370 is able to connect, for example, to an external power source.

The vehicle ECU 380 cooperatively controls the battery management unit 311 together with other units in response to inputs operated by a driver or the like, thereby performing the management of the whole vehicle. Data concerning the security of the vehicle power source 302, such as a remaining capacity of the vehicle power source 302, are transferred between the battery management unit 311 and the vehicle ECU 380 through communication lines.

The vehicle according to the fifth embodiment includes the battery pack according to the fourth embodiment. The vehicle according to the fifth embodiment, therefore, has good battery capacity by virtue of including the battery pack having high capacity. Also, a vehicle with high reliability can be provided by virtue of the battery pack being excellent in life performance.

EXAMPLES

Examples are explained below; however, the present disclosure is not limited to the following Examples so long as the present disclosure does not depart from the spirit of the embodiments.

Example 1

(Synthesis of Active Material)

Nickel sulfate, cobalt sulfate, and manganese sulfate were weighed at a composition ratio as shown in Table 1 (indicated by subscripts a, b, and c as would be taken when fitted into the general formula $Li_x(Ni_aCo_bMn_cM_d)_{1-s}(Nb_{1-t}Ta_t)_sO_2$), and dissolved in water. The resultant aqueous solution was added dropwise into an aqueous sodium hydroxide solution, and a nickel-cobalt-manganese composite hydroxide was obtained as a precipitate. The nickel-cobalt-manganese composite hydroxide, niobium chloride, tantalum chloride, and lithium hydroxide were mixed at a composition ratio shown in Table 1 (indicated by subscripts x, s, and t), and the mixture was fired at 850° C. for 12 hours. As a result, an active material was obtained.

(Preparation of Evaluation Electrode)

6 parts by weight of acetylene black as electro-conductive agent and 3 parts by weight of a PVdF binder were added to the obtained active material. The resultant was dispersed in N-methyl-2-pyrrolidone, and a coating slurry was obtained. The coating slurry was applied onto an Al foil, dried, and rolled, whereby two evaluation electrodes were obtained.

One of the two evaluation electrodes was subjected to an elemental composition analysis and space group measurement. The other was subjected to electrochemical evaluation.

(Elemental Composition Analysis)

The evaluation electrode was centrifugalized, and thereby, the active material was extracted. The obtained active material was subjected to an elemental composition analysis by the ICP emission spectrometry and the inert gas fusion-infrared absorption method. Furthermore, ion etching using Ar gas and Auger electron spectroscopy measurements were repeated, thereby measuring a change in transition metal composition in a depth direction of the active material. Then, the concentration of Nb and Ta elements in the region at the outermost surface of the active material was compared with the concentration of Nb and Ta elements in a region 1 µm inside from the outermost surface.

(Space Group Measurement)

The active material extracted from the evaluation electrodes was filled in a flat glass sample plate holder, and the space group was measured by a powder X-ray diffraction method.

The apparatus and conditions used for measurement is shown below:

Apparatus: SmartLab manufactured by Rigaku
X-ray source: Cu target
Output: 45 kV, 200 mA
soller slit : 5 degrees in both incident light and received light
step width (2θ): 0.02 deg
scan speed: 20 deg/min
semiconductor detector: D/teX Ultra 250
sample plate holder: flat glass sample plate holder (0.5 mm thick)
measurement range: range within 5°≤2θ≤90°

(Electrochemical Evaluation)

The electrochemical evaluation was performed through measurement of a discharge capacity and a capacity retention ratio after 100 cycles with a three-electrode cell, using the other evaluation electrode as a working electrode and using metal Li as a counter electrode and a reference electrode. The results of the evaluations are summarized in Table 1. Results of Examples 2 to 29 are also summarized in Table 1. Results of Examples 30 to 58 are summarized in Table 2. Results of Comparative Examples 1 to 29 are summarized in Table 3. Results of Comparative Examples 30 to 42 are summarized in Table 4. In the tables, the symbol "–" indicates that in terms of the general formula $Li_x(Ni_aCo_bMn_cM_d)_{1-s}(Nb_{1-t}Ta_t)_sO_2$, the relevant value is not applicable in the case such as when s=0; for example, t is indicated as being "–" since in the case of s=0, t cannot exist. Similarly, the degree of disproportionate presence of Nb and Ta at the surface (labeled as "Bias of Nb and Ta towards surface") is also indicated as "–" in the case of s=0, since Nb and Ta cannot exist in such a case.

(Discharge Capacity)

The discharge capacity was determined as follows. Constant current charging was performed to 4.3V vs Li/Li+ at a 1 C rate, then constant voltage charging was performed at 4.3 V for 2 hours. Thereafter, the battery was discharged to 3.0 V at 0.2 C rate. The capacity of discharge at this time was taken as the discharge capacity.

(Capacity Retention Ratio After 100 Cycles)

Charge and discharge were repeated for 100 cycles in the potential range of 4.3 V to 3.0 V at a 1 C rate, and the discharge capacity at the 100th cycle relative to the discharge capacity at the first cycle was calculated as the capacity retention ratio after 100 cycles.

Examples 2 to 13 and Examples 22 to 29

The active material was synthesized in the same manner as in Example 1 except that the elemental compositions listed in Table 1 were used. Then, preparations of evaluation electrodes, analyses of elemental compositions, measurements of space groups, and electrochemical evaluations were carried out, in the same manner as in Example 1.

Example 14

Al was used as the M element. Aluminum sulfate was used as a starting material containing Al.

The nickel-cobalt-manganese composite hydroxide obtained through the procedure of Example 1, aluminum sulfate, niobium chloride, tantalum chloride, and lithium hydroxide were mixed, and the resultant mixture was fired at 850° C. for 12 hours. Thus, an active material was obtained.

Preparations of evaluation electrodes, analyses of elemental compositions, measurements of space groups, and electrochemical evaluations were carried out in the same manner as in Example 1.

Example 15

Syntheses of active material, preparations of evaluation electrodes, analyses of elemental compositions, measurements of space groups, and electrochemical evaluations were carried out in the same manner as in Example 14, except that Ti was used as the M element, and titanium oxide was used as the starting material containing Ti.

Example 16

Syntheses of active material, preparations of evaluation electrodes, analyses of elemental compositions, measurements of space groups, and electrochemical evaluations were carried out in the same manner as in Example 14, except that V was used as the M element, and vanadium oxide was used as the starting material containing V.

Example 17

Syntheses of active material, preparations of evaluation electrodes, analyses of elemental compositions, measurements of space groups, and electrochemical evaluations were carried out in the same manner as in Example 14, except that Cr was used as the M element, and chromium oxide was used as the starting material containing Cr.

Example 18

Syntheses of active material, preparations of evaluation electrodes, analyses of elemental compositions, measurements of space groups, and electrochemical evaluations were carried out in the same manner as in Example 14, except that Zr was used as the M element, and zirconium oxide was used as the starting material containing Zr.

Example 19

Syntheses of active material, preparations of evaluation electrodes, analyses of elemental compositions, measurements of space groups, and electrochemical evaluations were carried out in the same manner as in Example 14, except that Mo was used as the M element, and molybdenum oxide was used as the starting material containing Mo.

Example 20

Syntheses of active material, preparations of evaluation electrodes, analyses of elemental compositions, measurements of space groups, and electrochemical evaluations were carried out in the same manner as in Example 14, except that Hf was used as the M element, and hafnium oxide was used as the starting material containing Hf.

Example 21

Syntheses of active material, preparations of evaluation electrodes, analyses of elemental compositions, measurements of space groups, and electrochemical evaluations were carried out in the same manner as in Example 14, except that W was used as the M element, and tungsten oxide was used as the starting material containing W.

Example 30

The nickel-cobalt-manganese composite hydroxide obtained through the procedure of Example 1, niobium chloride, and tantalum chloride were mixed, and the resultant mixture was fired at 950° C. for 12 hours. The fired product was mixed with lithium hydroxide, and the mixture was fired at 850° C. for 12 hours. Thus, an active material was obtained.

Preparations of evaluation electrodes, analyses of elemental compositions, measurements of space groups, and electrochemical evaluations were carried out in the same manner as in Example 1.

Examples 31 to 42 and Examples 51 to 58

The active material was synthesized in the same manner as in Example 30 except that the elemental compositions listed in Table 2 were used. Then, preparations of evaluation electrodes, analyses of elemental compositions, measurements of space groups, and electrochemical evaluations were carried out, in the same manner as in Example 30.

Example 43

Al was used as the M element, and aluminum sulfate was used as a starting material containing Al.

The nickel-cobalt-manganese composite hydroxide obtained through the procedure of Example 1, aluminum sulfate, niobium chloride, tantalum chloride, and lithium hydroxide were mixed, and the resultant mixture was fired at 950° C. for 12 hours. The fired product was mixed with lithium hydroxide, and the mixture was fired at 850° C. for 12 hours. Thus, an active material was obtained.

Preparations of evaluation electrodes, analyses of elemental compositions, measurements of space groups, and electrochemical evaluations were carried out in the same manner as in Example 1.

Example 44

Syntheses of active material, preparations of evaluation electrodes, analyses of elemental compositions, measurements of space groups, and electrochemical evaluations were carried out in the same manner as in Example 43, except that Ti was used as the M element, and titanium oxide was used as the starting material containing Ti.

Example 45

Syntheses of active material, preparations of evaluation electrodes, analyses of elemental compositions, measurements of space groups, and electrochemical evaluations were carried out in the same manner as in Example 43, except that V was used as the M element, and vanadium oxide was used as the starting material containing V.

Example 46

Syntheses of active material, preparations of evaluation electrodes, analyses of elemental compositions, measurements of space groups, and electrochemical evaluations were carried out in the same manner as in Example 43, except that Cr was used as the M element, and chromium oxide was used as the starting material containing Cr.

Example 47

Syntheses of active material, preparations of evaluation electrodes, analyses of elemental compositions, measurements of space groups, and electrochemical evaluations were carried out in the same manner as in Example 43, except that Zr was used as the M element, and zirconium oxide was used as the starting material containing Zr.

Example 48

Syntheses of active material, preparations of evaluation electrodes, analyses of elemental compositions, measurements of space groups, and electrochemical evaluations were carried out in the same manner as in Example 43, except that Mo was used as the M element, and molybdenum oxide was used as the starting material containing Mo.

Example 49

Syntheses of active material, preparations of evaluation electrodes, analyses of elemental compositions, measurements of space groups, and electrochemical evaluations were carried out in the same manner as in Example 43, except that Hf was used as the M element, and hafnium oxide was used as the starting material containing Hf.

Example 50

Syntheses of active material, preparations of evaluation electrodes, analyses of elemental compositions, measurements of space groups, and electrochemical evaluations were carried out in the same manner as in Example 43, except that W was used as the M element, and tungsten oxide was used as the starting material containing W.

Comparative Examples 1 to 29

Except that the elemental compositions listed in Table 3 were used, active materials were synthesized in the same manner as in Example 1 for Comparative Examples 1 to 29, and active materials were synthesized in the same manner as in Example 14 for Comparative Examples 14 to 21. For these active materials, preparations of evaluation electrodes, analyses of elemental compositions, measurements of space groups, and electrochemical evaluations were carried out.

Comparative Examples 30 to 42

Active materials were synthesized in the same manner as in Example 30 except that the elemental compositions listed in Table 4 were used. Then, preparations of evaluation electrodes, analyses of elemental compositions, measurements of space groups, and electrochemical evaluations were carried out, in the same manner as in Example 30.

TABLE 1

| | M element | Space group | x | a | b | c | d | s | t | Bias of Nb and Ta towards surface | Discharge capacity (mAh/g) | Capacity retention ratio after 100 cycles (%) |
|---|---|---|---|---|---|---|---|---|---|---|---|---|
| Example 1 | — | R3/m | 1.03 | 0.8 | 0.1 | 0.1 | 0 | 0.005 | 0.001 | present | 202 | 90 |
| Example 2 | — | R3/m | 1.03 | 0.8 | 0.1 | 0.1 | 0 | 0.01 | 0.001 | present | 200 | 92 |
| Example 3 | — | R3/m | 1.03 | 0.8 | 0.1 | 0.1 | 0 | 0.05 | 0.001 | present | 198 | 95 |
| Example 4 | — | R3/m | 1.03 | 0.8 | 0.1 | 0.1 | 0 | 0.1 | 0.001 | present | 194 | 94 |
| Example 5 | — | R3/m | 1.03 | 0.8 | 0.1 | 0.1 | 0 | 0.05 | 0.0005 | present | 198 | 92 |
| Example 6 | — | R3/m | 1.03 | 0.8 | 0.1 | 0.1 | 0 | 0.05 | 0.01 | present | 197 | 90 |
| Example 7 | — | R3/m | 1.03 | 0.8 | 0.1 | 0.1 | 0 | 0.05 | 0.1 | present | 197 | 88 |
| Example 8 | — | R3/m | 1.03 | 0.9 | 0.05 | 0.05 | 0 | 0.05 | 0.001 | present | 208 | 87 |
| Example 9 | — | R3/m | 1.03 | 0.7 | 0.15 | 0.15 | 0 | 0.05 | 0.001 | present | 190 | 91 |
| Example 10 | — | R3/m | 1.03 | 0.6 | 0.2 | 0.2 | 0 | 0.05 | 0.001 | present | 181 | 91 |
| Example 11 | — | R3/m | 1.03 | 0.5 | 0.2 | 0.3 | 0 | 0.05 | 0.001 | present | 164 | 94 |
| Example 12 | — | R3/m | 1.03 | 0.34 | 0.33 | 0.33 | 0 | 0.05 | 0.001 | present | 155 | 95 |
| Example 13 | — | R3/m | 1 | 0 | 1 | 0 | 0 | 0.05 | 0.001 | present | 140 | 96 |
| Example 14 | Al | R3/m | 1.03 | 0.85 | 0.1 | 0 | 0.05 | 0.05 | 0.001 | present | 201 | 88 |
| Example 15 | Ti | R3/m | 1.03 | 0.8 | 0.1 | 0.05 | 0.05 | 0.05 | 0.001 | present | 199 | 95 |
| Example 16 | V | R3/m | 1.03 | 0.8 | 0.1 | 0.05 | 0.05 | 0.05 | 0.001 | present | 197 | 94 |
| Example 17 | Cr | R3/m | 1.03 | 0.8 | 0.1 | 0.05 | 0.05 | 0.05 | 0.001 | present | 197 | 95 |
| Example 18 | Zr | R3/m | 1.03 | 0.8 | 0.1 | 0.05 | 0.05 | 0.05 | 0.001 | present | 194 | 95 |
| Example 19 | Mo | R3/m | 1.03 | 0.8 | 0.1 | 0.05 | 0.05 | 0.05 | 0.001 | present | 196 | 94 |
| Example 20 | Hf | R3/m | 1.03 | 0.8 | 0.1 | 0.05 | 0.05 | 0.05 | 0.001 | present | 193 | 93 |
| Example 21 | W | R3/m | 1.03 | 0.8 | 0.1 | 0.05 | 0.05 | 0.05 | 0.001 | present | 199 | 95 |
| Example 22 | Li | C2/m | 1 | 0.2 | 0 | 0.6 | 0.2 | 0.005 | 0.001 | present | 268 | 90 |
| Example 23 | Li | C2/m | 1 | 0.2 | 0 | 0.6 | 0.2 | 0.01 | 0.001 | present | 266 | 91 |
| Example 24 | Li | C2/m | 1 | 0.2 | 0 | 0.6 | 0.2 | 0.05 | 0.001 | present | 265 | 93 |
| Example 25 | Li | C2/m | 1 | 0.2 | 0 | 0.6 | 0.2 | 0.1 | 0.001 | present | 262 | 91 |
| Example 26 | Li | C2/m | 1 | 0.2 | 0 | 0.6 | 0.2 | 0.05 | 0.0005 | present | 265 | 89 |
| Example 27 | Li | C2/m | 1 | 0.2 | 0 | 0.6 | 0.2 | 0.05 | 0.01 | present | 264 | 88 |
| Example 28 | Li | C2/m | 1 | 0.2 | 0 | 0.6 | 0.2 | 0.05 | 0.1 | present | 262 | 86 |
| Example 29 | Li | Fm-3m | 1 | 0 | 0 | 0.57 | 0.43 | 0.3 | 0.001 | present | 277 | 86 |

TABLE 2

| | M element | Space group | x | a | b | c | d | s | t | Bias of Nb and Ta towards surface | Discharge capacity (mAh/g) | Capacity retention ratio after 100 cycles (%) |
|---|---|---|---|---|---|---|---|---|---|---|---|---|
| Example 30 | — | R3/m | 1.03 | 0.8 | 0.1 | 0.1 | 0 | 0.005 | 0.001 | none | 201 | 87 |
| Example 31 | — | R3/m | 1.03 | 0.8 | 0.1 | 0.1 | 0 | 0.01 | 0.001 | none | 200 | 90 |
| Example 32 | — | R3/m | 1.03 | 0.8 | 0.1 | 0.1 | 0 | 0.05 | 0.001 | none | 197 | 93 |
| Example 33 | — | R3/m | 1.03 | 0.8 | 0.1 | 0.1 | 0 | 0.1 | 0.001 | none | 194 | 92 |
| Example 34 | — | R3/m | 1.03 | 0.8 | 0.1 | 0.1 | 0 | 0.05 | 0.0005 | none | 198 | 90 |
| Example 35 | — | R3/m | 1.03 | 0.8 | 0.1 | 0.1 | 0 | 0.05 | 0.01 | none | 196 | 89 |
| Example 36 | — | R3/m | 1.03 | 0.8 | 0.1 | 0.1 | 0 | 0.05 | 0.1 | none | 197 | 87 |
| Example 37 | — | R3/m | 1.03 | 0.9 | 0.05 | 0.05 | 0 | 0.05 | 0.001 | none | 207 | 85 |
| Example 38 | — | R3/m | 1.03 | 0.7 | 0.15 | 0.15 | 0 | 0.05 | 0.001 | none | 190 | 89 |
| Example 39 | — | R3/m | 1.03 | 0.6 | 0.2 | 0.2 | 0 | 0.05 | 0.001 | none | 180 | 90 |
| Example 40 | — | R3/m | 1.03 | 0.5 | 0.2 | 0.3 | 0 | 0.05 | 0.001 | none | 164 | 93 |
| Example 41 | — | R3/m | 1.03 | 0.34 | 0.33 | 0.33 | 0 | 0.05 | 0.001 | none | 155 | 94 |
| Example 42 | — | R3/m | 1 | 0 | 1 | 0 | 0 | 0.05 | 0.001 | none | 139 | 95 |
| Example 43 | Al | R3/m | 1.03 | 0.85 | 0.1 | 0 | 0.05 | 0.05 | 0.001 | none | 199 | 86 |
| Example 44 | Ti | R3/m | 1.03 | 0.8 | 0.1 | 0.05 | 0.05 | 0.05 | 0.001 | none | 198 | 94 |
| Example 45 | V | R3/m | 1.03 | 0.8 | 0.1 | 0.05 | 0.05 | 0.05 | 0.001 | none | 197 | 93 |
| Example 46 | Cr | R3/m | 1.03 | 0.8 | 0.1 | 0.05 | 0.05 | 0.05 | 0.001 | none | 196 | 93 |
| Example 47 | Zr | R3/m | 1.03 | 0.8 | 0.1 | 0.05 | 0.05 | 0.05 | 0.001 | none | 194 | 94 |
| Example 48 | Mo | R3/m | 1.03 | 0.8 | 0.1 | 0.05 | 0.05 | 0.05 | 0.001 | none | 196 | 92 |
| Example 49 | Hf | R3/m | 1.03 | 0.8 | 0.1 | 0.05 | 0.05 | 0.05 | 0.001 | none | 193 | 91 |
| Example 50 | W | R3/m | 1.03 | 0.8 | 0.1 | 0.05 | 0.05 | 0.05 | 0.001 | none | 198 | 94 |
| Example 51 | Li | C2/m | 1 | 0.2 | 0 | 0.6 | 0.2 | 0.005 | 0.001 | none | 268 | 87 |
| Example 52 | Li | C2/m | 1 | 0.2 | 0 | 0.6 | 0.2 | 0.01 | 0.001 | none | 264 | 88 |
| Example 53 | Li | C2/m | 1 | 0.2 | 0 | 0.6 | 0.2 | 0.05 | 0.001 | none | 262 | 90 |
| Example 54 | Li | C2/m | 1 | 0.2 | 0 | 0.6 | 0.2 | 0.1 | 0.001 | none | 262 | 88 |
| Example 55 | Li | C2/m | 1 | 0.2 | 0 | 0.6 | 0.2 | 0.05 | 0.0005 | none | 263 | 86 |
| Example 56 | Li | C2/m | 1 | 0.2 | 0 | 0.6 | 0.2 | 0.05 | 0.01 | none | 263 | 85 |
| Example 57 | Li | C2/m | 1 | 0.2 | 0 | 0.6 | 0.2 | 0.05 | 0.1 | none | 262 | 85 |
| Example 58 | Li | Fm-3m | 1 | 0 | 0 | 0.57 | 0.43 | 0.3 | 0.001 | none | 276 | 85 |

TABLE 3

| | M element | Space group | x | a | b | c | d | s | t | Bias of Nb and Ta towards surface | Discharge capacity (mAh/g) | Capacity retention ratio after 100 cycles (%) |
|---|---|---|---|---|---|---|---|---|---|---|---|---|
| Comparative Example 1 | — | R3/m | 1.03 | 0.8 | 0.1 | 0.1 | 0 | 0 | — | — | 202 | 80 |
| Comparative Example 2 | — | R3/m | 1.03 | 0.8 | 0.1 | 0.1 | 0 | 0.001 | 0.05 | present | 200 | 81 |
| Comparative Example 3 | — | R3/m | 1.03 | 0.8 | 0.1 | 0.1 | 0 | 0.4 | 0.05 | present | 125 | 83 |
| Comparative Example 4 | — | R3/m | 1.03 | 0.8 | 0.1 | 0.1 | 0 | 0.05 | 0 | present | 198 | 85 |
| Comparative Example 5 | — | R3/m | 1.03 | 0.8 | 0.1 | 0.1 | 0 | 0.05 | 0.0001 | present | 197 | 86 |
| Comparative Example 6 | — | R3/m | 1.03 | 0.8 | 0.1 | 0.1 | 0 | 0.05 | 0.2 | present | 194 | 85 |
| Comparative Example 7 | — | R3/m | 1.03 | 0.8 | 0.1 | 0.1 | 0 | 0.05 | 1 | present | 192 | 82 |
| Comparative Example 8 | — | R3/m | 1.03 | 0.9 | 0.05 | 0.05 | 0 | 0 | — | — | 212 | 73 |
| Comparative Example 9 | — | R3/m | 1.03 | 0.7 | 0.15 | 0.15 | 0 | 0 | — | — | 193 | 82 |
| Comparative Example 10 | — | R3/m | 1.03 | 0.6 | 0.2 | 0.2 | 0 | 0 | — | — | 184 | 83 |
| Comparative Example 11 | — | R3/m | 1.03 | 0.5 | 0.2 | 0.3 | 0 | 0 | — | — | 169 | 85 |
| Comparative Example 12 | — | R3/m | 1.03 | 0.34 | 0.33 | 0.33 | 0 | 0 | — | — | 160 | 86 |
| Comparative Example 13 | — | R3/m | 1 | 0 | 1 | 0 | 0 | 0 | — | — | 142 | 87 |
| Comparative Example 14 | Al | R3/m | 1.03 | 0.85 | 0.1 | 0 | 0.05 | 0 | — | — | 206 | 75 |
| Comparative Example 15 | Ti | R3/m | 1.03 | 0.8 | 0.1 | 0.05 | 0.05 | 0 | — | — | 202 | 81 |
| Comparative Example 16 | V | R3/m | 1.03 | 0.8 | 0.1 | 0.05 | 0.05 | 0 | — | — | 201 | 80 |
| Comparative Example 17 | Cr | R3/m | 1.03 | 0.8 | 0.1 | 0.05 | 0.05 | 0 | — | — | 203 | 81 |
| Comparative Example 18 | Zr | R3/m | 1.03 | 0.8 | 0.1 | 0.05 | 0.05 | 0 | — | — | 198 | 82 |
| Comparative Example 19 | Mo | R3/m | 1.03 | 0.8 | 0.1 | 0.05 | 0.05 | 0 | — | — | 201 | 81 |
| Comparative Example 20 | Hf | R3/m | 1.03 | 0.8 | 0.1 | 0.05 | 0.05 | 0 | — | — | 197 | 79 |
| Comparative Example 21 | W | R3/m | 1.03 | 0.8 | 0.1 | 0.05 | 0.05 | 0 | — | — | 202 | 82 |
| Comparative Example 22 | Li | C2/m | 1 | 0.2 | 0 | 0.6 | 0.2 | 0 | — | — | 268 | 80 |
| Comparative Example 23 | Li | C2/m | 1 | 0.2 | 0 | 0.6 | 0.2 | 0.001 | 0.05 | present | 266 | 80 |
| Comparative Example 24 | Li | C2/m | 1 | 0.2 | 0 | 0.6 | 0.2 | 0.4 | 0.05 | present | 245 | 81 |
| Comparative Example 25 | Li | C2/m | 1 | 0.2 | 0 | 0.6 | 0.2 | 0.05 | 0 | present | 262 | 80 |
| Comparative Example 26 | Li | C2/m | 1 | 0.2 | 0 | 0.6 | 0.2 | 0.05 | 0.0001 | present | 262 | 78 |
| Comparative Example 27 | Li | C2/m | 1 | 0.2 | 0 | 0.6 | 0.2 | 0.05 | 0.2 | present | 262 | 77 |
| Comparative Example 28 | Li | C2/m | 1 | 0.2 | 0 | 0.6 | 0.2 | 0.05 | 1 | present | 261 | 75 |
| Comparative Example 29 | Li | Fm-3m | 1 | 0 | 0 | 0.57 | 0.43 | 0.3 | 0 | present | 275 | 75 |

TABLE 4

| | M element | Space group | x | a | b | c | d | s | t | Bias of Nb and Ta towards surface | Discharge capacity (mAh/g) | Capacity retention ratio after 100 cycles (%) |
|---|---|---|---|---|---|---|---|---|---|---|---|---|
| Comparative Example 30 | — | R3/m | 1.03 | 0.8 | 0.1 | 0.1 | 0 | 0.001 | 0.05 | none | 199 | 81 |
| Comparative Example 31 | — | R3/m | 1.03 | 0.8 | 0.1 | 0.1 | 0 | 0.4 | 0.05 | none | 120 | 82 |

TABLE 4-continued

| | M element | Space group | x | a | b | c | d | s | t | Bias of Nb and Ta towards surface | Discharge capacity (mAh/g) | Capacity retention ratio after 100 cycles (%) |
|---|---|---|---|---|---|---|---|---|---|---|---|---|
| Comparative Example 32 | — | R3/m | 1.03 | 0.8 | 0.1 | 0.1 | 0 | 0.05 | 0 | none | 197 | 83 |
| Comparative Example 33 | — | R3/m | 1.03 | 0.8 | 0.1 | 0.1 | 0 | 0.05 | 0.0001 | none | 196 | 86 |
| Comparative Example 34 | — | R3/m | 1.03 | 0.8 | 0.1 | 0.1 | 0 | 0.05 | 0.2 | none | 192 | 83 |
| Comparative Example 35 | — | R3/m | 1.03 | 0.8 | 0.1 | 0.1 | 0 | 0.05 | 1 | none | 190 | 81 |
| Comparative Example 36 | Li | C2/m | 1 | 0.2 | 0 | 0.6 | 0.2 | 0.001 | 0.05 | none | 266 | 79 |
| Comparative Example 37 | Li | C2/m | 1 | 0.2 | 0 | 0.6 | 0.2 | 0.4 | 0.05 | none | 244 | 80 |
| Comparative Example 38 | Li | C2/m | 1 | 0.2 | 0 | 0.6 | 0.2 | 0.05 | 0 | none | 263 | 80 |
| Comparative Example 39 | Li | C2/m | 1 | 0.2 | 0 | 0.6 | 0.2 | 0.05 | 0.0001 | none | 264 | 77 |
| Comparative Example 40 | Li | C2/m | 1 | 0.2 | 0 | 0.6 | 0.2 | 0.05 | 0.2 | none | 263 | 77 |
| Comparative Example 41 | Li | C2/m | 1 | 0.2 | 0 | 0.6 | 0.2 | 0.05 | 1 | none | 263 | 75 |
| Comparative Example 42 | Li | Fm-3m | 1 | 0 | 0 | 0.57 | 0.43 | 0.3 | 0 | none | 270 | 73 |

As evident from Tables 1 to 4, by having the element composition $Li_x(Ni_aCo_bMn_cM_d)_{1-s}(Nb_{1-t}Ta_t)_sO_2$, where M is at least one element selected from the group consisting of Li, Ca, Mg, Al, Ti, V, Cr, Zr, Mo, Hf, and W, and where $1.0 \leq x \leq 1.3$, $0 \leq a \leq 0.9$, $0 \leq b \leq 1.0$, $0 \leq c \leq 0.8$, $0 \leq d \leq 0.5$, $a+b+c+d=1$, $0.005 \leq s \leq 0.3$, $0.0005 \leq t \leq 0.1$, obtained is an active material that can provide a secondary battery of a high capacity and long lifetime. Furthermore, it is evident that an active material that can provide a secondary battery of longer lifetime can be obtained by making Nb and Ta at the active material surface be disproportionately present, so that the amount of Nb and Ta existing at the active material surface is more than that of Nb and Ta existing inside the active material.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An active material represented by a general formula $Li_x(Ni_aCo_bMn_cM_d)_{1-s}(Nb_{1-t}Ta_t)_sO_2$, where M is at least one selected from the group consisting of Li, Ca, Mg, Al, Ti, V, Cr, Zr, Mo, Hf, and W, and satisfying $1.0 \leq x \leq 1.3$, $0 \leq a \leq 0.9$, $0 \leq b \leq 1.0$, $0 \leq c \leq 0.8$, $0 \leq d \leq 0.5$, $a+b+c+d=1$, $0.005 \leq s \leq 0.3$, $0.0005 \leq t \leq 0.1$.

2. The active material according to claim 1, having a crystal structure that belongs to a space group of any one of space groups R3/m, C2/m, and Fm–3m.

3. The active material according to claim 1, wherein s in the general formula falls within a range $0.01 \leq s \leq 0.1$.

4. The active material according claim 1, wherein t in the general formula falls within a range $0.001 \leq t \leq 0.01$.

5. The active material according to claim 1, wherein the active material is in a form of particles, and an amount of Nb and Ta present at a surface of each of the particles is greater than that of Nb and Ta present inside the active material.

6. An electrode comprising the active material according to claim 1.

7. The electrode according to claim 6, comprising an active material mixture layer, the active material mixture layer comprising the active material, an electro-conductive agent and a binder.

8. A secondary battery comprising:
a positive electrode, the positive electrode being the electrode according to claim 6;
a negative electrode; and
an electrolyte.

9. A battery pack comprising the secondary battery according to claim 8.

10. The battery pack according to claim 9, further comprising:
an external power distribution terminal; and
a protective circuit.

11. The battery pack according to claim 9, comprising plural of the secondary battery, the secondary batteries being electrically connected in series, in parallel, or in a combination of in-series and in-parallel.

12. A vehicle comprising the battery pack according to claim 9.

13. The vehicle according to claim 12, wherein the battery pack is configured to recover regenerative energy of motive force of the vehicle.

14. The vehicle according to claim 12, which comprises a mechanism configured to convert kinetic energy of the vehicle into regenerative energy.

* * * * *